(12) United States Patent
Beck et al.

(10) Patent No.: US 9,706,089 B2
(45) Date of Patent: Jul. 11, 2017

(54) SHIFTED LENS CAMERA FOR MOBILE COMPUTING DEVICES

(71) Applicant: Microsoft Technology Licensing, LLC, Redmond, WA (US)

(72) Inventors: Douglas Beck, Kirkland, WA (US); Todd Schoepflin, Shoreline, WA (US); Chun Beng Goh, Bellevue, WA (US); Hakon Strande, Woodinville, WA (US); Raymond Cheng Hui Xue, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/780,228

(22) Filed: Feb. 28, 2013

(65) Prior Publication Data
US 2013/0229570 A1    Sep. 5, 2013

Related U.S. Application Data

(63) Continuation-in-part of application No. 13/471,054, filed on May 14, 2012, now Pat. No. 9,275,809.
(Continued)

(51) Int. Cl.
*H04N 5/225* (2006.01)
*G06F 1/16* (2006.01)
*H04M 1/02* (2006.01)

(52) U.S. Cl.
CPC ......... *H04N 5/2254* (2013.01); *G06F 1/1618* (2013.01); *G06F 1/1626* (2013.01);
(Continued)

(58) Field of Classification Search
CPC .. H04N 5/2254; H04N 5/2257; G06F 1/1626; G06F 1/1654; G06F 1/1669;
(Continued)

(56) References Cited

U.S. PATENT DOCUMENTS 4,251,791 A    2/1981   Yanagisawa et al.
4,375,018 A    2/1983   Petersen
(Continued)

FOREIGN PATENT DOCUMENTS

CA      990023      6/1976
CN     2363007      2/2000
(Continued)

OTHER PUBLICATIONS

What is Active Alignment?—Retrieved Date: Nov. 22, 2012 Proceedings: NA Author: NA Pages: NA http://www.kasalis.com/active_alignment.html.
(Continued)

*Primary Examiner* — Lin Ye
*Assistant Examiner* — Euel Cowan

(57) ABSTRACT

Techniques of shifting the lens stack from an image capture sensor within a smart device and/or mobile device are disclosed. The shifting of the center of the lens stack from the center of the sensor allows the Field of View (FOV) of such a camera assembly to have an angle from the normal and/or perpendicular direction from the surface of the device. Such an angle allows the FOV to be substantially horizontal and/or parallel to a surface when the device is held (e.g. by a kickstand) at a similar angle from the vertical direction. When the front of the lens stack is substantially at a front surface of the device and the sensor is attached to a back surface of the device, then the Total Track Length (TTL) is substantially the depth of the device.

23 Claims, 14 Drawing Sheets

Related U.S. Application Data

(60) Provisional application No. 61/606,321, filed on Mar. 2, 2012, provisional application No. 61/606,301, filed on Mar. 2, 2012, provisional application No. 61/606,313, filed on Mar. 2, 2012, provisional application No. 61/606,333, filed on Mar. 2, 2012, provisional application No. 61/613,745, filed on Mar. 21, 2012, provisional application No. 61/606,336, filed on Mar. 2, 2012, provisional application No. 61/607,451, filed on Mar. 6, 2012.

(52) U.S. Cl.
CPC .......... *G06F 1/1654* (2013.01); *G06F 1/1669* (2013.01); *G06F 1/1681* (2013.01); *G06F 1/1686* (2013.01); *G06F 1/1694* (2013.01); *H04N 5/2257* (2013.01); *G06F 2200/1637* (2013.01); *H04M 1/0264* (2013.01); *H04M 2250/52* (2013.01)

(58) Field of Classification Search
CPC .... G06F 1/1681; G06F 1/1686; G06F 1/1694; G06F 2200/1637; H04M 1/0264; H04M 2250/52
USPC ............ 438/64; 250/239; 348/208.12, 220.1, 348/345, 348–357, 361
See application file for complete search history.

(56) References Cited

U.S. PATENT DOCUMENTS

| | | | |
|---|---|---|---|
| 4,652,704 A | 3/1987 | Franklin | |
| 4,724,605 A | 2/1988 | Fiorella | |
| 4,801,771 A | 1/1989 | Mizuguchi et al. | |
| 4,983,787 A | 1/1991 | Kunikane | |
| 5,107,401 A | 4/1992 | Youn | |
| 5,138,119 A | 8/1992 | Demeo | |
| 5,218,177 A | 6/1993 | Coleman et al. | |
| 5,235,495 A | 8/1993 | Blair et al. | |
| 5,243,162 A | 9/1993 | Kobayashi | |
| 5,584,713 A | 12/1996 | Kato et al. | |
| 5,617,343 A | 4/1997 | Danielson et al. | |
| 5,803,748 A | 9/1998 | Maddrell et al. | |
| 5,995,081 A | 11/1999 | Kato | |
| 6,002,581 A | 12/1999 | Lindsey | |
| 6,014,800 A | 1/2000 | Lee | |
| 6,108,200 A | 8/2000 | Fullerton | |
| 6,151,486 A | 11/2000 | Holshouser et al. | |
| 6,178,085 B1 | 1/2001 | Leung | |
| 6,305,073 B1 | 10/2001 | Badders | |
| 6,468,672 B1 | 10/2002 | Donovan, III et al. | |
| 6,704,005 B2 | 3/2004 | Kato et al. | |
| 6,856,506 B2 | 2/2005 | Doherty et al. | |
| 6,981,887 B1 | 1/2006 | Mese et al. | |
| 7,123,292 B1 | 10/2006 | Seeger | |
| 7,159,132 B2 | 1/2007 | Takahashi et al. | |
| 7,447,922 B1 | 11/2008 | Asbury et al. | |
| 7,481,566 B2 | 1/2009 | Han | |
| 7,541,907 B2 | 6/2009 | Wang et al. | |
| 7,542,052 B2 | 6/2009 | Solomon et al. | |
| 7,594,638 B2 | 9/2009 | Chan et al. | |
| 7,629,966 B2 | 12/2009 | Anson | |
| 7,693,654 B1 | 4/2010 | Dietsch et al. | |
| 7,777,972 B1 | 8/2010 | Chen | |
| 7,782,342 B2 | 8/2010 | Koh | |
| 7,822,338 B2* | 10/2010 | Wernersson .................. 396/429 | |
| 8,243,432 B2 | 8/2012 | Duan et al. | |
| 8,289,115 B2 | 10/2012 | Cretella, Jr. et al. | |
| 8,387,938 B2 | 3/2013 | Lin | |
| 8,421,757 B2 | 4/2013 | Suzuki et al. | |
| 8,424,160 B2 | 4/2013 | Chen | |
| 8,446,359 B2 | 5/2013 | Doczy et al. | |
| 8,477,100 B2 | 7/2013 | Wang et al. | |
| 8,514,568 B2 | 8/2013 | Qiao et al. | |
| 8,520,371 B2 | 8/2013 | Peng et al. | |
| 8,569,640 B2 | 10/2013 | Yamada et al. | |
| 8,587,701 B2 | 11/2013 | Tatsuzawa | |
| 8,633,898 B2 | 1/2014 | Westerman et al. | |
| 8,744,070 B2 | 6/2014 | Zhang et al. | |
| 8,754,854 B1 | 6/2014 | Hamburgen et al. | |
| 8,767,388 B2 | 7/2014 | Ahn et al. | |
| 8,797,765 B2 | 8/2014 | Lin et al. | |
| 8,823,652 B2 | 9/2014 | Linegar et al. | |
| 8,891,232 B2 | 11/2014 | Wang | |
| 8,908,858 B2 | 12/2014 | Chiu et al. | |
| 8,918,546 B2 | 12/2014 | Cheah et al. | |
| 8,934,221 B2 | 1/2015 | Guo | |
| 8,939,422 B2 | 1/2015 | Liu et al. | |
| 8,964,376 B2 | 2/2015 | Chen | |
| 8,997,983 B2 | 4/2015 | Sajid | |
| 9,134,807 B2 | 9/2015 | Shaw et al. | |
| 9,134,808 B2 | 9/2015 | Siddiqui et al. | |
| 9,146,620 B2 | 9/2015 | Whitt et al. | |
| 9,158,383 B2 | 10/2015 | Shaw et al. | |
| 9,158,384 B2 | 10/2015 | Whitt, III et al. | |
| 9,176,900 B2 | 11/2015 | Whitt, III et al. | |
| 9,176,901 B2 | 11/2015 | Whitt, III et al. | |
| 9,189,428 B2 | 11/2015 | Pollmann et al. | |
| 9,298,236 B2 | 3/2016 | Oler et al. | |
| 9,304,549 B2 | 4/2016 | Siddiqui | |
| 9,304,948 B2 | 4/2016 | Whitman et al. | |
| 9,304,949 B2 | 4/2016 | Whitman et al. | |
| 9,317,072 B2 | 4/2016 | Park et al. | |
| 9,348,605 B2 | 5/2016 | Drasnin | |
| 9,354,748 B2 | 5/2016 | Lutian et al. | |
| 9,360,893 B2 | 6/2016 | Bathiche et al. | |
| 9,411,751 B2 | 8/2016 | Whitt et al. | |
| 9,426,905 B2 | 8/2016 | Bathiche et al. | |
| 9,447,620 B2 | 9/2016 | Park et al. | |
| 9,460,029 B2 | 10/2016 | Shaw et al. | |
| 9,465,412 B2 | 10/2016 | Belesiu et al. | |
| 9,618,977 B2 | 4/2017 | Whitt et al. | |
| 9,619,071 B2 | 4/2017 | Perek et al. | |
| 2002/0044216 A1 | 4/2002 | Cha | |
| 2002/0126446 A1 | 9/2002 | Miyako et al. | |
| 2003/0000821 A1 | 1/2003 | Takahashi et al. | |
| 2003/0044216 A1 | 3/2003 | Fang | |
| 2003/0231243 A1 | 12/2003 | Shibutani | |
| 2004/0085716 A1 | 5/2004 | Uke | |
| 2005/0047773 A1 | 3/2005 | Satake et al. | |
| 2005/0064765 A1 | 3/2005 | Simpson et al. | |
| 2005/0073756 A1 | 4/2005 | Poulsen | |
| 2005/0134717 A1* | 6/2005 | Misawa ................... 348/333.06 | |
| 2005/0153753 A1 | 7/2005 | Cheng | |
| 2005/0206737 A1* | 9/2005 | Gim ..................... G02B 27/648 |  348/208.11 |
| 2005/0264653 A1 | 12/2005 | Starkweather et al. | |
| 2006/0102020 A1 | 5/2006 | Takada et al. | |
| 2006/0110537 A1 | 5/2006 | Huang et al. | |
| 2006/0132456 A1 | 6/2006 | Anson | |
| 2006/0155391 A1 | 7/2006 | Pistemaa et al. | |
| 2006/0176377 A1 | 8/2006 | Miyasaka | |
| 2006/0220465 A1 | 10/2006 | Kingsmore et al. | |
| 2007/0003267 A1 | 1/2007 | Shibutani | |
| 2007/0126994 A1 | 6/2007 | Hwang | |
| 2007/0127205 A1 | 6/2007 | Kuo | |
| 2007/0153545 A1 | 7/2007 | Lee | |
| 2007/0172229 A1* | 7/2007 | Wernersson ......... H04N 5/2251 | 396/429 |
| 2007/0223248 A1 | 9/2007 | Han | |
| 2007/0236873 A1 | 10/2007 | Yukawa et al. | |
| 2007/0252674 A1 | 11/2007 | Nelson et al. | |
| 2007/0257821 A1 | 11/2007 | Son et al. | |
| 2007/0268200 A1 | 11/2007 | Fuller et al. | |
| 2007/0268273 A1 | 11/2007 | Westerman et al. | |
| 2007/0297125 A1 | 12/2007 | Maatta | |
| 2008/0042978 A1 | 2/2008 | Perez-Noguera | |
| 2008/0186660 A1 | 8/2008 | Yang | |
| 2008/0186683 A1 | 8/2008 | Ligtenberg et al. | |
| 2008/0273297 A1 | 11/2008 | Kumar | |
| 2008/0318008 A1 | 12/2008 | Wielstra et al. | |
| 2009/0174759 A1 | 7/2009 | Yeh et al. | |
| 2009/0177906 A1 | 7/2009 | Paniagua, Jr. et al. | |

(56) References Cited

U.S. PATENT DOCUMENTS

| | | |
|---|---|---|
| 2009/0201254 A1 | 8/2009 | Rais |
| 2009/0244872 A1 | 10/2009 | Yan |
| 2009/0302175 A1 | 12/2009 | Torii et al. |
| 2009/0317595 A1 | 12/2009 | Brehm et al. |
| 2009/0320244 A1 | 12/2009 | Lin |
| 2010/0006412 A1 | 1/2010 | Wang et al. |
| 2010/0072334 A1 | 3/2010 | Le Gette et al. |
| 2010/0078328 A1 | 4/2010 | Mandler et al. |
| 2010/0128427 A1 | 5/2010 | Iso |
| 2010/0149377 A1* | 6/2010 | Shintani ............... H04N 5/232 348/231.5 |
| 2010/0174421 A1 | 7/2010 | Tsai et al. |
| 2010/0201308 A1 | 8/2010 | Lindholm |
| 2010/0207774 A1 | 8/2010 | Song |
| 2010/0220205 A1 | 9/2010 | Lee et al. |
| 2010/0259876 A1 | 10/2010 | Kim |
| 2010/0302378 A1 | 12/2010 | Marks et al. |
| 2010/0315345 A1 | 12/2010 | Laitinen |
| 2011/0045317 A1 | 2/2011 | Hao et al. |
| 2011/0069148 A1 | 3/2011 | Jones |
| 2011/0074688 A1 | 3/2011 | Hull et al. |
| 2011/0074702 A1 | 3/2011 | Pertuit et al. |
| 2011/0080367 A1 | 4/2011 | Marchand et al. |
| 2011/0102752 A1 | 5/2011 | Chen et al. |
| 2011/0108401 A1 | 5/2011 | Yamada et al. |
| 2011/0134161 A1 | 6/2011 | Son et al. |
| 2011/0149094 A1 | 6/2011 | Chen et al. |
| 2011/0157037 A1 | 6/2011 | Shamir et al. |
| 2011/0164357 A1 | 7/2011 | Yeom et al. |
| 2011/0176035 A1* | 7/2011 | Poulsen ............... G03B 5/06 348/241 |
| 2011/0227913 A1 | 9/2011 | Hyndman |
| 2011/0234494 A1 | 9/2011 | Peterson et al. |
| 2011/0241999 A1 | 10/2011 | Thier |
| 2011/0265287 A1 | 11/2011 | Li et al. |
| 2011/0291958 A1 | 12/2011 | Wu et al. |
| 2011/0297566 A1* | 12/2011 | Gallagher ............ F16M 11/105 206/320 |
| 2011/0298919 A1 | 12/2011 | Maglaque |
| 2011/0310548 A1 | 12/2011 | Ahn et al. |
| 2012/0013490 A1 | 1/2012 | Pance |
| 2012/0105481 A1 | 5/2012 | Baek et al. |
| 2012/0156875 A1 | 6/2012 | Srinivas et al. |
| 2012/0162889 A1 | 6/2012 | Han |
| 2012/0224073 A1 | 9/2012 | Miyahara |
| 2012/0256848 A1 | 10/2012 | Madabusi Srinivasan |
| 2012/0274578 A1 | 11/2012 | Snow et al. |
| 2012/0274811 A1 | 11/2012 | Bakin |
| 2012/0300275 A1 | 11/2012 | Vilardell et al. |
| 2012/0306747 A1 | 12/2012 | Davidson et al. |
| 2013/0002562 A1 | 1/2013 | Leskela et al. |
| 2013/0007665 A1 | 1/2013 | Chaudhri et al. |
| 2013/0009413 A1* | 1/2013 | Chiu et al. ............... 294/142 |
| 2013/0015311 A1 | 1/2013 | Kim |
| 2013/0063465 A1 | 3/2013 | Zaman |
| 2013/0076614 A1 | 3/2013 | Ive et al. |
| 2013/0093679 A1 | 4/2013 | Dickinson et al. |
| 2013/0118878 A1 | 5/2013 | Purcocks |
| 2013/0159417 A1 | 6/2013 | Meckler et al. |
| 2013/0215035 A1 | 8/2013 | Guard |
| 2013/0229534 A1 | 9/2013 | Panay |
| 2013/0321992 A1 | 12/2013 | Liu et al. |
| 2013/0342976 A1 | 12/2013 | Chung |
| 2013/0346882 A1 | 12/2013 | Shiplacoff et al. |
| 2014/0085814 A1 | 3/2014 | Kielland |
| 2014/0104189 A1 | 4/2014 | Marshall et al. |
| 2014/0139989 A1 | 5/2014 | Mori et al. |
| 2014/0167585 A1 | 6/2014 | Kuan et al. |
| 2014/0225821 A1 | 8/2014 | Kim et al. |
| 2014/0293534 A1 | 10/2014 | Siddiqui |
| 2014/0313665 A1 | 10/2014 | Delpier et al. |
| 2014/0370937 A1 | 12/2014 | Park et al. |
| 2014/0379991 A1 | 12/2014 | Lomet et al. |
| 2015/0022995 A1 | 1/2015 | Peterson et al. |
| 2015/0185950 A1 | 7/2015 | Watanabe et al. |
| 2015/0234478 A1 | 8/2015 | Belesiu et al. |
| 2015/0253872 A1 | 9/2015 | Reyes |
| 2015/0261262 A1 | 9/2015 | Whitt, III et al. |
| 2015/0286125 A1 | 10/2015 | Powell |
| 2016/0034424 A1 | 2/2016 | Won |
| 2016/0034695 A1 | 2/2016 | Won et al. |
| 2016/0037481 A1 | 2/2016 | Won et al. |
| 2016/0124467 A1 | 5/2016 | Whitt et al. |
| 2016/0170935 A1 | 6/2016 | Drasnin |
| 2016/0209884 A1 | 7/2016 | Whitt et al. |
| 2016/0299537 A1 | 10/2016 | Whitt et al. |
| 2016/0306396 A1 | 10/2016 | Bathiche et al. |
| 2017/0131819 A1 | 5/2017 | Shaw et al. |
| 2017/0147084 A1 | 5/2017 | Whitt et al. |

FOREIGN PATENT DOCUMENTS

| | | |
|---|---|---|
| CN | 1394119 | 1/2003 |
| CN | 1467615 | 1/2004 |
| CN | 1489031 | 4/2004 |
| CN | 1537223 | 10/2004 |
| CN | 200947406 | 9/2007 |
| CN | 101335147 | 12/2008 |
| CN | 101490642 | 7/2009 |
| CN | 101765825 | 6/2010 |
| CN | 101904661 | 12/2010 |
| CN | 102004577 | 4/2011 |
| CN | 102012772 | 4/2011 |
| CN | 102117121 | 7/2011 |
| CN | 102138113 | 7/2011 |
| CN | 102156510 | 8/2011 |
| CN | 201936231 | 8/2011 |
| CN | 102214040 | 10/2011 |
| CN | 102292687 | 12/2011 |
| CN | 202119579 | 1/2012 |
| CN | 102339683 | 2/2012 |
| CN | 102356624 | 2/2012 |
| CN | 102778956 | 11/2012 |
| CN | 203480365 | 3/2014 |
| EP | 2006869 | 12/2008 |
| EP | 2009660 | 12/2008 |
| EP | 2353978 | 8/2011 |
| EP | 2400365 | 12/2011 |
| EP | 2423787 | 2/2012 |
| GB | 2305780 | 4/1997 |
| GB | 2482932 | 2/2012 |
| JP | S57126617 | 8/1982 |
| JP | S5810335 | 1/1983 |
| JP | S593824 | 1/1984 |
| JP | 6014315 | 1/1985 |
| JP | S6037923 | 8/1985 |
| JP | S60216479 | 10/1985 |
| JP | H0195596 | 4/1989 |
| JP | H0245820 | 2/1990 |
| JP | 04363823 | 12/1992 |
| JP | 4363823 | 12/1992 |
| JP | 06250761 | 9/1994 |
| JP | 08273471 | 10/1996 |
| JP | H1078357 | 3/1998 |
| JP | H11248557 | 9/1999 |
| JP | 2000035849 | 2/2000 |
| JP | 2001142564 | 5/2001 |
| JP | 2002170458 | 6/2002 |
| JP | 2002358852 | 12/2002 |
| JP | 2002366277 | 12/2002 |
| JP | 2003257282 | 9/2003 |
| JP | 2005031555 | 2/2005 |
| JP | 2005078104 | 3/2005 |
| JP | 2005117161 | 4/2005 |
| JP | 2005302447 | 10/2005 |
| JP | 2006093461 | 4/2006 |
| JP | 2006266812 | 10/2006 |
| JP | 2008152805 | 7/2008 |
| JP | 2009009854 | 1/2009 |
| JP | 2010272384 | 12/2010 |
| JP | 2003077368 | 3/2014 |
| KR | 20050014299 | 2/2005 |
| KR | 20110122333 | 11/2011 |
| WO | WO-2008117529 | 10/2008 |

(56) References Cited

FOREIGN PATENT DOCUMENTS

| WO | WO 2009034484 | 3/2009 |
|---|---|---|
| WO | WO2011071096 | 6/2011 |
| WO | WO2011138200 | 11/2011 |

OTHER PUBLICATIONS

Tilt Shift Lenses: Perspective Control—Published Date: Mar. 28, 2008 Proceedings: NA Author: NA Pages: NA http://www.cambridgeincolour.com/tutorials/tilt-shift-lenses1.htm.
"Advisory Action", U.S. Appl. No. 13/471,376, Sep. 23, 2015, 7 pages.
"Advisory Action", U.S. Appl. No. 14/059,280, Sep. 25, 2015, 7 pages.
"Corrected Notice of Allowance", U.S. Appl. No. 13/564,520, Sep. 17, 2015, 2 pages.
"Corrected Notice of Allowance", U.S. Appl. No. 14/225,276, Aug. 27, 2015, 2 pages.
"Corrected Notice of Allowance", U.S. Appl. No. 14/225,276, Sep. 29, 2015, 2 pages.
"Corrected Notice of Allowance", U.S. Appl. No. 14/457,881, Aug. 20, 2015, 2 pages.
"Corrected Notice of Allowance", U.S. Appl. No. 14/457,881, Oct. 2, 2015, 2 pages.
"Decision on Reexamination", CN Application No. 201320097079.5, Sep. 7, 2015, 8 Pages.
"Extended European Search Report", EP Application No. 13858283.8, Nov. 23, 2015, 10 pages.
"Extended European Search Report", EP Application No. 13858397.6, Nov. 30, 2015, 7 pages.
"Extended European Search Report", EP Application No. 13858674.8, Nov. 27, 2015, 6 pages.
"Extended European Search Report", EP Application No. 13859280.3, Sep. 7, 2015, 6 pages.
"Extended European Search Report", EP Application No. 13859406.4, Sep. 8, 2015, 6 pages.
"Extended European Search Report", EP Application No. 13860272.7, Dec. 14, 2015, 9 pages.
"Extended European Search Report", EP Application No. 13861292.4, Nov. 23, 2015, 7 pages.
"Final Office Action", U.S. Appl. No. 13/471,336, Dec. 10, 2015, 17 pages.
"Final Office Action", U.S. Appl. No. 13/653,218, Oct. 5, 2015, 16 pages.
"Final Office Action", U.S. Appl. No. 14/063,912, Sep. 3, 2015, 13 pages.
"Foreign Office Action", CN Application No. 201310067385.9, Aug. 6, 2015, 16 pages.
"Foreign Office Action", CN Application No. 201310067429.8, Nov. 25, 2015, 12 Pages.
"Foreign Office Action", CN Application No. 201310067627.4, Sep. 28, 2015, 14 pages.
"Foreign Office Action", CN Application No. 201310067631.0, Dec. 10, 2015, 11 Pages.
"Foreign Office Action", CN Application No. 201310316114.2, Sep. 29, 2015, 13 pages.
"Non-Final Office Action", U.S. Appl. No. 13/470,951, Oct. 1, 2015, 29 pages.
"Non-Final Office Action", U.S. Appl. No. 13/471,393, Sep. 30, 2015, 15 pages.
"Non-Final Office Action", U.S. Appl. No. 13/784,746, Oct. 7, 2015, 15 pages.
"Non-Final Office Action", U.S. Appl. No. 14/225,250, Aug. 19, 2015, 9 pages.
"Notice of Allowance", U.S. Appl. No. 13/527,263, Dec. 9, 2015, 6 pages.
"Supplemental Notice of Allowance", U.S. Appl. No. 13/468,949, Sep. 14, 2015, 2 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, Jan. 2013, 1 page.
"Final Office Action", U.S. Appl. No. 13/471,054, Oct. 23, 2014, 17 pages.
"Final Office Action", U.S. Appl. No. 13/852,848, Jul. 20, 2015, 9 pages.
"Foreign Office Action", CN Application No. 201320097079.5, Jul. 28, 2014, 4 pages.
"Foreign Office Action", CN Application No. 201320097079.5, Sep. 26, 2013, 4 pages.
"International Preliminary Report on Patentability", Application No. PCT/US2014/031531, Jun. 9, 2015, 7 pages.
"International Search Report and Written Opinion", Application No. PCT/US2014/031531, Jun. 20, 2014, 10 Pages.
"International Search Report and Written Opinion", Application No. PCT/US2013/028484, Jun. 24, 2014, 10 pages.
"Non-Final Office Action", U.S. Appl. No. 13/471,054, Mar. 13, 2015, 18 pages.
"Non-Final Office Action", U.S. Appl. No. 13/471,054, Jun. 3, 2014, 15 pages.
"Non-Final Office Action", U.S. Appl. No. 13/780,228, Sep. 18, 2015, 19 pages.
"Non-Final Office Action", U.S. Appl. No. 13/852,848, Mar. 26, 2015, 7 pages.
"Non-Final Office Action", U.S. Appl. No. 14/162,529, Sep. 18, 2015, 13 pages.
"Non-Final Office Action", U.S. Appl. No. 14/727,001, Jul. 10, 2015, 7 pages.
"Notice of Allowance", U.S. Appl. No. 13/471,054, Sep. 25, 2015, 7 pages.
"Notice of Allowance", U.S. Appl. No. 14/727,001, Oct. 2, 2015, 4 pages.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, Jun. 2012, 2 pages.
Purcher,"Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012, Retrieved from: <http://www.patentlyapple.com/patently-apple/2012/01/apple-is-paving-the-way-for-a-new-3d-gui-for-ios-devices.html> on Jun. 4, 2012, Jan. 12, 2012, 15 pages.
"Corrected Notice of Allowance", U.S. Appl. No. 13/371,725, Mar. 29, 2016, 2 pages.
"Corrected Notice of Allowance", U.S. Appl. No. 13/371,725, May 5, 2016, 2 pages.
"Corrected Notice of Allowance", U.S. Appl. No. 13/470,951, Jul. 8, 2016, 2 pages.
"Corrected Notice of Allowance", U.S. Appl. No. 13/471,412, Mar. 3, 2016, 2 pages.
"Corrected Notice of Allowance", U.S. Appl. No. 13/527,263, Mar. 7, 2016, 2 pages.
"Corrected Notice of Allowance", U.S. Appl. No. 13/527,263, Apr. 12, 2016, 2 pages.
"Corrected Notice of Allowance", U.S. Appl. No. 13/527,263, Apr. 25, 2016, 2 pages.
"Corrected Notice of Allowance", U.S. Appl. No. 13/852,848, Mar. 2, 2016, 2 pages.
"Corrected Notice of Allowance", U.S Appl. No. 13/891,109, Jun. 21, 2016, 2 pages.
"Corrected Notice of Allowance", U.S Appl. No. 14/166,596, Mar. 14, 2016, 2 pages.
"Corrected Notice of Allowance", U.S. Appl. No. 14/517,048, Apr. 13, 2016, 2 pages.
"Extended European Search Report", EP Application No. 13728568.0, Mar. 14, 2016, 16 pages.
"Extended European Search Report", EP Application No. 13858403.2, Mar. 16, 2016, 12 pages.
"Extended European Search Report", EP Application No. 13860271.9, May 4, 2016, 8 pages.

(56) References Cited

OTHER PUBLICATIONS

"Extended European Search Report", EP Application No. 13861059.7, Apr. 29, 2016, 8 pages.
"Final Office Action", U.S. Appl. No. 13/471,393, Mar. 9, 2016, 17 pages.
"Final Office Action", U.S. Appl. No. 13/492,232, May 25, 2016, 12 pages.
"Final Office Action", U.S. Appl. No. 13/769,356, Mar. 23, 2016, 15 pages.
"Final Office Action", U.S. Appl. No. 14/447,109, Jul. 11, 2016, 9 pages.
"Final Office Action", U.S. Appl. No. 14/794,182, Sep. 15, 2016, 25 pages.
"Final Office Action", U.S. Appl. No. 14/994,737, Aug. 26, 2016, 6 pages.
"Foreign Notice of Allowance", CN Application No. 201310065273.X, Mar. 31, 2016, 4 Pages.
"Foreign Notice of Allowance", CN Application No. 201320097079.5, Apr. 1, 2016, 4 Pages.
"Foreign Notice of Allowance", CN Application No. 201310067531.8, Jun. 7, 2016, 4 pages.
"Foreign Notice of Allowance", CN Application No. 201310067592.4, May 17, 2016, 4 pages.
"Foreign Notice of Allowance", CN Application No. 201310067631.0, Aug. 5, 2016, 4 pages.
"Foreign Notice of Allowance", CN Application No. 201310067808.7, May 4, 2016, 4 pages.
"Foreign Notice of Allowance", CN Application No. 201310316114.2, Aug. 2, 2016, 4 pages.
"Foreign Office Action", CL Application No. 14-211.785, Apr. 26, 2016, 12 pages.
"Foreign Office Action", CN Application No. 201310067356.2, Feb. 4, 2016, 15 Pages.
"Foreign Office Action", CN Application No. 201310067385.9, Apr. 14, 2016, 14 Pages.
"Foreign Office Action", CN Application No. 201310067429.8, Jul. 20, 2016, 11 pages.
"Foreign Office Action", CN Application No. 201310067603.9, Feb. 15, 2016, 12 Pages.
"Foreign Office Action", CN Application No. 201310067622.1, Jun. 21, 2016, 14 Pages.
"Foreign Office Action", CN Application No. 201310067627.4, May 3, 2016, 7 pages.
"Foreign Office Action", CN Application No. 201310067641.4, Jul. 27, 2016, 8 pages.
"Foreign Office Action", CN Application No. 201310096345.7, May 25, 2016, 16 Pages.
"Foreign Office Action", CN Application No. 201310225788.1, Feb. 29, 2016, 11 Pages.
"Foreign Office Action", CN Application No. 201310316114.2, Apr. 18, 2016, 11 pages.
"Foreign Office Action", CN Application No. 201380025290.9, May 10, 2016, 15 pages.
"Foreign Office Action", EP Application No. 14703759.2, Jun. 16, 2016, 9 pages.
"International Preliminary Report on Patentability", Application No. PCT/US2014/068687, Mar. 11, 2016, 7 pages.
"Non-Final Office Action", U.S. Appl. No. 13/471,336, Aug. 30, 2016, 17 pages.
"Non-Final Office Action", U.S. Appl. No. 13/653,218, Apr. 20, 2016, 17 pages.
"Non-Final Office Action", U.S. Appl. No. 13/689,541, Apr. 14, 2016, 23 pages.
"Non-Final Office Action", U.S. Appl. No. 13/773,496, Jun. 29, 2016, 17 pages.
"Non-Final Office Action", U.S. Appl. No. 13/926,944, May 2, 2016, 10 pages.
"Non-Final Office Action", U.S. Appl. No. 14/162,529, Apr. 6, 2016, 17 pages.
"Non-Final Office Action", U.S. Appl. No. 14/225,250, Jul. 1, 2016, 9 pages.
"Non-Final Office Action", U.S. Appl. No. 14/307,262, Apr. 20, 2016, 10 pages.
"Non-Final Office Action", U.S. Appl. No. 14/447,262, Jun. 3, 2016, 13 pages.
"Non-Final Office Action", U.S. Appl. No. 14/543,746, Jun. 1, 2016, 9 pages.
"Non-Final Office Action", U.S. Appl. No. 14/794,182, Apr. 13, 2016, 15 pages.
"Non-Final Office Action", U.S. Appl. No. 14/994,737, Apr. 5, 2016, 6 pages.
"Notice of Allowance", U.S. Appl. No. 13/468,882, May 24, 2016, 5 pages.
"Notice of Allowance", U.S. Appl. No. 13/470,951, Mar. 24, 2016, 8 pages.
"Notice of Allowance", U.S. Appl. No. 13/891,109, May 6, 2016, 7 pages.
"Notice of Allowance", U.S. Appl. No. 14/517,048, Feb. 24, 2016, 8 pages.
"Notice of Allowance", U.S. Appl. No. 14/517,048, Jul. 7, 2016, 7 pages.
"Notice of Allowance", U.S. Appl. No. 14/698,318, May 6, 2016, 13 pages.
"Restriction Requirement", U.S. Appl. No. 14/307,262, Mar. 21, 2016, 6 pages.
"Supplemental Notice of Allowance", U.S. Appl. No. 14/517,048, Aug. 10, 2016, 2 pages.
"Supplemental Notice of Allowance", U.S. Appl. No. 14/517,048, Aug. 19, 2016, 2 pages.
"Final Office Action", U.S. Appl. No. 13/773,496, Dec. 27, 2016, 18 pages.
"Final Office Action", U.S. Appl. No. 14/225,250, Dec. 27, 2016, 10 pages.
"Foreign Notice of Allowance", CN Application No. 201310067429.8, Dec. 13, 2016, 4 pages.
"Foreign Office Action", CN Application No. 201310067523.3, Nov. 7, 2016, 12 pages.
"Foreign Office Action", CN Application No. 201480036444.9, Nov. 11, 2016, 12 pages.
"Foreign Office Action", JP Application No. 2014-560122, Dec. 6, 2016, 10 pages.
"Non-Final Office Action", U.S. Appl. No. 14/162,529, Jan. 12, 2017, 24 pages.
"Non-Final Office Action", U.S. Appl. No. 14/847,838, Dec. 16, 2016, 24 pages.
"Notice of Allowance", U.S. Appl. No. 14/307,262, Nov. 30, 2016, 5 pages.
"Notice of Allowance", U.S. Appl. No. 14/482,983, Jan. 4, 2017, 10 pages.
"Notice of Allowance", U.S. Appl. No. 14/994,737, Nov. 30, 2016, 5 pages.
"Final Office Action", U.S Appl. No. 13/926,944, Sep. 23, 2016, 4 pages.
"Final Office Action", U.S. Appl. No. 14/162,529, Sep. 28, 2016, 19 pages.
"Final Office Action", U.S. Appl. No. 14/307,262, Sep. 29, 2016, 7 pages.
"Foreign Notice of Allowance", CN Application No. 201310067627.4, Oct. 24, 2016, 4 pages.
"Foreign Office Action", CN Application No. 201310067356.2, Oct. 9, 2016, 13 pages.
"Foreign Office Action", CN Application No. 201310067373.6, Aug. 18, 2016, 16 pages.
"Foreign Office Action", CN Application No. 201310067385.9, Oct. 8, 2016, 6 pages.
"Foreign Office Action", CN Application No. 201310067603.9, Oct. 17, 2016, 6 pages.
"Foreign Office Action", CN Application No. 201310096345.7, Oct. 9, 2016, 15 pages.
"Foreign Office Action", CN Application No. 201310225788.1, Sep. 1, 2016, 8 pages.

(56) References Cited

OTHER PUBLICATIONS

"Foreign Office Action", CN Application No. 201380025290.9, Oct. 19, 2016, 8 pages.
"Foreign Office Action", CN Application No. 201480006798.9, Sep. 14, 2016, 13 pages.
"Foreign Office Action", EP Application No. 13858283.8, Nov. 2, 2016, 5 pages.
"Foreign Office Action", EP Application No. 13858674.8, Oct. 26, 2016, 5 pages.
"Foreign Office Action", EP Application No. 14745256.9, Oct. 6, 2016, 5 pages.
"Non-Final Office Action", U.S. Appl. No. 13/471,393, Oct. 5, 2016, 17 pages.
"Non-Final Office Action", U.S. Appl. No. 14/147,252, Oct. 12, 2016, 17 pages.
"Non-Final Office Action", U.S. Appl. No. 14/704,423, Sep. 26, 2016, 11 pages.
"Non-Final Office Action", U.S. Appl. No. 15/050,072, Sep. 23, 2016, 5 pages.
"Restriction Requirement", U.S. Appl. No. 13/653,218, Oct. 21, 2016, 6 pages.
What is Active Alignment?—Retrieved Date: Nov. 22, 2012, Proceedings: NA, Author: NA, pp. NA, http://www.kasalis.com/active_alignment.html.
Tilt Shift Lenses: Perspective Control—Published Date: Mar. 28, 2008-03-28, Proceedings: NA, Author: NA, pp. NA, http://www.cambridgeincolour.com/tutorials/tilt-shift-lenses1.htm.
"Corrected Notice of Allowance", U.S. Appl. No. 14/482,983, Mar. 13, 2017, 5 pages.
"Corrected Notice of Allowance", U.S. Appl. No. 14/482,983, Feb. 22, 2017, 6 pages.
"Corrected Notice of Allowance", U.S. Appl. No. 14/944,737, Jan. 18, 2017, 2 pages.
"Corrected Notice of Allowance", U.S. Appl. No. 14/994,737, Mar. 2, 2017, 2 pages.
"Examiner's Answer to Appeal Brief", U.S. Appl. No. 13/492,232, Feb. 9, 2017, 5 pages.
"Foreign Notice of Allowance", CN Application No. 201310096345.7, Feb. 4, 2017, 4 pages.
"Foreign Office Action", Application No. 13861292.4, Jan. 3, 2017, 4 pages.
"Foreign Office Action", CN Application No. 201310067373.6, Dec. 27, 2016, 12 pages.
"Foreign Office Action", CN Application No. 201310067641.4, Jan. 23, 2017, 7 pages.
"Foreign Office Action", EP Application No. 13859661.4, Dec. 23, 2016, 4 pages.
"Foreign Office Action", JP Application No. 2014-560073, Jan. 4, 2017, 7 pages.
"Foreign Office Action", JP Application No. 2014-560119, Jan. 4, 2017, 6 pages.
"Foreign Office Action", JP Application No. 2014-560120, Jan. 10, 2017, 5 pages.
"Foreign Office Action", JP Application No. 2014-560121, Dec. 20, 2016, 8 pages.
"Foreign Office Action", JP Application No. 2015-512767, Jan. 24, 2017, 8 pages.
"Non-Final Office Action", U.S. Appl. No. 14/692,497, Feb. 22, 2017, 8 pages.
"Notice of Allowance", U.S. Appl. No. 13/653,218, Mar. 10, 2017, 13 pages.
"Corrected Notice of Allowance", U.S. Appl. No. 14/994,737, Mar. 20, 2017, 2 pages.
"Corrected Notice of Allowance", U.S. Appl. No. 14/994,737, Mar. 30, 2017, 2 pages.
"Corrected Notice of Allowance", U.S. Appl. No. 14/994,737, May 10, 2017, 2 pages.
"Foreign Notice of Allowance", CN Application No. 201310067385.9, Feb. 20, 2017, 4 pages.
"Foreign Office Action", CN Application No. 201310067356.2, Mar. 20, 2017, 9 pages.
"Foreign Office Action", CN Application No. 201310067603.9, Apr. 19, 2017, 12 pages.
"Foreign Office Action", CN Application No. 201380025290.9, Mar. 27, 2017, 13 pages.
"Foreign Office Action", CN Application No. 201480006798.9, Apr. 13, 2017, 12 pages.
"Foreign Office Action", EP Application No. 13730686.6, Mar. 27, 2017, 6 pages.
"Foreign Office Action", EP Application No. 14720018.2, Mar. 7, 2017, 7 pages.
"Non-Final Office Action", U.S. Appl. No. 14/225,250, Mar. 20, 2017, 7 pages.
"Non-Final Office Action", U.S. Appl. No. 15/050,072, May 12, 2017, 9 pages.
"Non-Final Office Action", U.S. Appl. No. 15/083,008, Mar. 24, 2017, 13 pages.
"Non-Final Office Action", U.S. Appl. No. 15/184,566, Mar. 30, 2017, 9 pages.
"Notice of Allowance", U.S. Appl. No. 14/147,252, Apr. 14, 2017, 7 pages.
"Notice of Allowance", U.S. Appl. No. 14/847,838, May 4, 2017, 10 pages.
"Supplemental Notice of Allowance", U.S. Appl. No. 13/653,218, May 16, 2017, 2 page.
"Supplemental Notice of Allowance", U.S. Appl. No. 13/653,218, Apr. 7, 2017, 3 pages.
"Supplemental Notice of Allowance", U.S. Appl. No. 14/147,252, May 3, 2017, 2 pages.
"Supplemental Notice of Allowance", U.S. Appl. No. 14/147,252, May 15, 2017, 2 pages.
"Foreign Notice of Allowance", JP Application No. 2014-560119, Apr. 18, 2017, 4 pages.
"Non-Final Office Action", U.S. Appl. No. 15/425,799, Jun. 2, 2017, 12 pages.

* cited by examiner

SHIFTED LENS CAMERA FOR MOBILE COMPUTING DEVICES

RELATED APPLICATIONS

This application is a continuation-in-part application of, and takes benefit of priority to, U.S. patent application Ser. No. 13/471,054 filed May 14, 2012—which in turn takes benefit of priority to (as well as the present application) the following U.S. Provisional Patent Applications, the entire disclosures of all of these applications being incorporated by reference in their entirety:

U.S. Provisional Patent Application No. 61/606,321, filed Mar. 2, 2012, and titled "Screen Edge;"

U.S. Provisional Patent Application No. 61/606,301, filed Mar. 2, 2012, and titled "Input Device Functionality;"

U.S. Provisional Patent Application No. 61/606,313, filed Mar. 2, 2012, and titled "Functional Hinge;"

U.S. Provisional Patent Application No. 61/606,333, filed Mar. 2, 2012, and titled "Usage and Authentication;"

U.S. Provisional Patent Application No. 61/613,745, filed Mar. 21, 2012, and titled "Usage and Authentication;"

U.S. Provisional Patent Application No. 61/606,336, filed Mar. 2, 2012, and titled "Kickstand and Camera;" and U.S. Provisional Patent Application No. 61/607,451, filed Mar. 6, 2012, and titled "Spanaway Provisional."

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on.

Many mobile computing devices include an integrated camera. Such devices are typically held at a particular angle in order for an integrated camera to capture an image. Thus, images can be cut-off or out-of-focus if the device is not held or positioned at the correct angle relative to an object being photographed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques of shifting the lens stack from an image capture sensor within a smart device and/or mobile device are disclosed. The shifting of the center of the lens stack from the center of the sensor allows the Field of View (FOV) of such a camera assembly to have an angle from the normal and/or perpendicular direction from the surface of the device. Such an angle allows the FOV to be substantially horizontal and/or parallel to a surface when the device is held (e.g. by a kickstand) at a similar angle from the vertical direction. When the front of the lens stack is substantially at a front surface of the device and the sensor is attached to a back surface of the device, then the Total Track Length (TTL) is substantially the depth of the device.

In one embodiment, an apparatus is disclosed comprising: a computing device, said computing device comprising a first side and a second side, the distance between said first side and said second side is substantially the depth of said computing device; and a camera assembly, said camera assembly comprising a sensor and a lens stack; and wherein said sensor and said lens stack are operably attached to said computing device such that the center of said lens stack is shifted from the center of said sensor.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
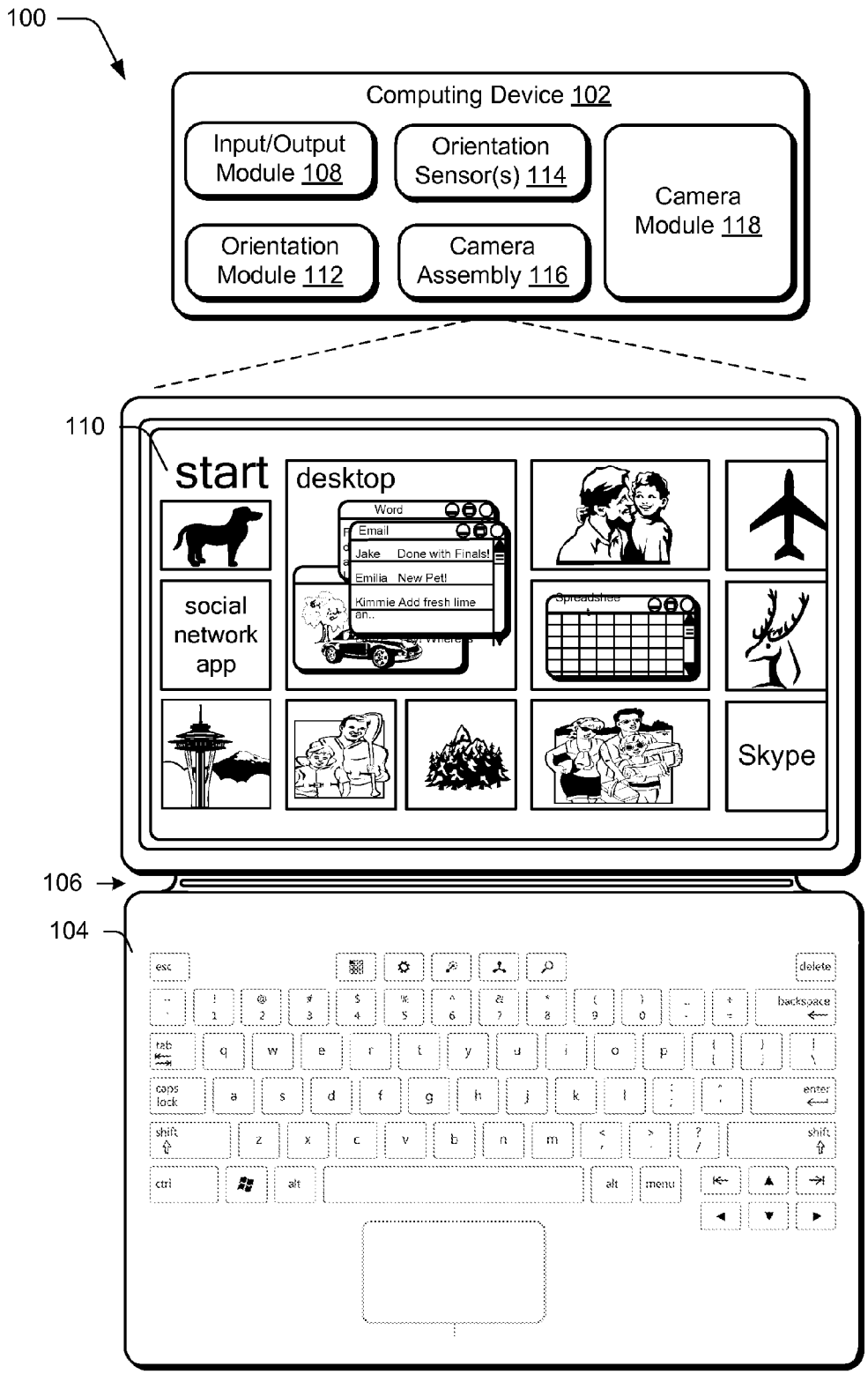
FIG. 1 is an illustration of an environment in an example implementation that is operable to employ the techniques described herein.

Techniques for device camera angle are described. In one or more implementations, a computing device includes a kickstand that can support the computing device on a surface. For example, kickstand can be opened to a particular position, and the computing device can be positioned on a surface (e.g., a table, a desk, and so on) such that a user can interact with the computing device. A user, for instance, can provide input to the computing device via an attached input device. Further, a user can view and/or interact with a display device included on the computing device.

In at least some embodiments, a camera is mounted in a computing device at an angle based on an orientation of the computing device. For example, when the computing device is positioned on a surface and at an angle to the surface (such as when supported by a kickstand), the mounting angle of the camera is such that the camera points forward, and not towards the surface. For instance, consider a scenario where the computing device is placed on a table in a room at a preset angle supported by a kickstand, such that a user sitting at the table can view a display on the computing device. The camera can be mounted in the computing device on a surface opposite the display device, such that the field of view of the camera points away from the display device. Further, the camera is mounted at an angle in the computing device such that the user can capture images (e.g., still images, video, and so on) of objects in the room, such as other persons sitting at the table, a whiteboard on a wall, and so forth. Thus, the field of view of the camera can be perpendicular to the table such that the camera is not simply pointing down at the table. In implementations, this can provide a "tripod experience" whereby a computing device that includes a camera can be supported by a kickstand, and the camera is angled such that images of surrounding objects can be captured, e.g., recorded.

In at least some implementations, a computing device includes a camera that is physically adjustable to support different orientations of the computing device. Components of the camera, for instance, can be tilted, rotated, and/or panned based on a detected orientation of the computing device. This can enable a field of view of the camera to be adjusted to enable images of objects to be captured in different orientations of the computing device.

In at least some implementations, images that are captured via a camera on a computing device can be manipulated based on an orientation of the computing device. For example, various types of image enhancement and/or correction can be applied to image data to account for phenomena that may arise when images are captured at particular angles, such as low light, image distortion, and so on.

In the following discussion, an example environment is first described that may employ techniques described herein. Next, a section entitled "Example Device Orientations" describes some example mobile device orientations in accordance with one or more embodiments. Following this, a section entitled "Example Camera Assembly" describes some example camera assemblies and camera components in accordance with one or more embodiments. Next, an example procedure is described which may be performed in the example environment as well as other environments. Consequently, performance of the example procedure is not limited to the example environment and the example environment is not limited to performance of the example procedure. Finally, an example system and device are described in which embodiments may be implemented in accordance with one or more embodiments. Further, although an input device is described, other devices are also contemplated that do not include input functionality, such as covers.

Example Environment

FIG. 1 is an illustration of an environment 100 in an example implementation that is operable to employ techniques described herein. The illustrated environment 100 includes an example of a computing device 102 that is physically and communicatively coupled to an input device 104 via a flexible hinge 106. The computing device 102 may be configured in a variety of ways. For example, the computing device 102 may be configured for mobile use, such as a mobile phone, a tablet computer as illustrated, and so on. Thus, the computing device 102 may range from full resource devices with substantial memory and processor resources to a low-resource device with limited memory and/or processing resources. The computing device 102 may also relate to software that causes the computing device 102 to perform one or more operations.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the input device 104, keys of a virtual keyboard displayed by a display device 110 to identify gestures and cause operations to be performed that correspond to the gestures that may be recognized through the input device 104 and/or touchscreen functionality of the display device 110, and so forth. Thus, the input/output module 108 may support a variety of different input techniques by recognizing and leveraging a division between types of inputs including key presses, gestures, and so on.

In the illustrated example, the input device 104 is configured as having an input portion that includes a keyboard having a QWERTY arrangement of keys and track pad although other arrangements of keys are also contemplated. Further, other non-conventional configurations are also contemplated, such as a game controller, configuration to mimic a musical instrument, and so forth. Thus, the input device 104 and keys incorporated by the input device 104 may assume a variety of different configurations to support a variety of different functionality.

As previously described, the input device 104 is physically and communicatively coupled to the computing device 102 in this example through use of a flexible hinge 106. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one or more directions (e.g., vertically in the figure) yet restrict movement in other directions, such as lateral movement of the input device 104 in relation to the computing device 102. This may be used to support consistent alignment of the input device 104 in relation to the computing device 102, such as to align sensors used to change power states, application states, and so on.

The flexible hinge 106, for instance, may be formed using one or more layers of fabric and include conductors formed as flexible traces to communicatively couple the input device 104 to the computing device 102 and vice versa. This communication, for instance, may be used to communicate a result of a key press to the computing device 102, receive power from the computing device, perform authentication, provide supplemental power to the computing device 102, and so on. The flexible hinge 106 may be configured in a variety of way in accordance with one or more embodiments.

The computing device 102 further includes an orientation module 112, which is representative of functionality to determine a positional orientation of the computing device

102. For example, the orientation module 112 can utilize orientation information received from one or more orientation sensors 114. The orientation sensors 114 are representative of functionality to detect types of orientation information for the computing device 102, such as angles relative to gravity, relative tilt, angle relative to earth's magnetic field, and so forth. Examples of the orientation sensors 114 include an accelerometer, magnetometer, tilt sensor, inclinometer, and so on. A variety of other types of orientation sensors may additionally or alternatively be employed, however.

The orientation module 112 can utilize the orientation information to determine a relative orientation of the computing device 102. The relative orientation, for instance, can indicate an angle at which the computing device 102 is tilted, such as with reference to the ground, e.g., earth's gravitational field. Orientation information can be leveraged to perform various tasks, examples of which are discussed above and below.

A camera assembly 116 is included, which is representative of functionality to record images, such as still images, video, and so on. The camera assembly 116 can include various image capture components, such as a lens, a mirror, an electronic image sensor, and so on. The camera assembly 116 can also include structural components employed to mount image capture components into the computing device 102, such as a component carrier in which the image capture components can be installed. The component carrier can enable the image capture components to be securely mounted in the computing device 102. In at least some embodiments, the component carrier can also enable various adjustments to be made to angles at which images are captured, as detailed below.

The computing device 102 also includes a camera module 118, which is representative of functionality to perform various operations related to image capture and image adjustment. The camera module 118 can also cause adjustments to be made to various components of the camera assembly 116. The camera module 118, for instance, can utilize orientation information received from the orientation module 112 and/or the orientation sensors 114. The camera module 118 can leverage the orientation information to perform various operations, such as adjusting components of the camera assembly 116 to account for orientation of the computing device 102, image manipulation based on orientation of the computing device 102, and so forth. Examples of such operations are detailed below.

Figure 2:
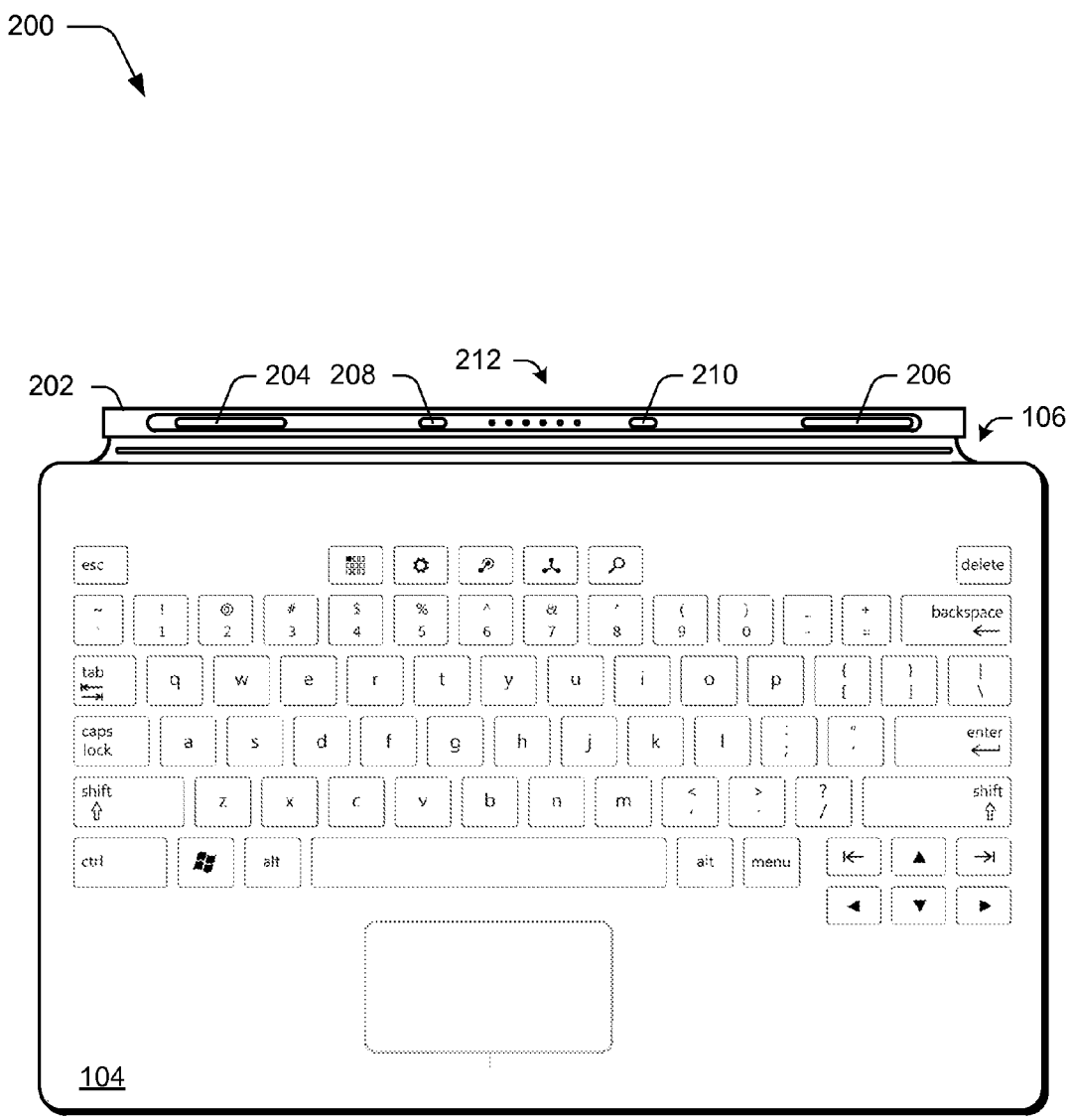
FIG. 2 depicts an example implementation of an input device of FIG. 1 as showing a flexible hinge in greater detail.

FIG. 2 depicts an example implementation 200 of the input device 104 of FIG. 1 as showing the flexible hinge 106 in greater detail. In this example, a connection portion 202 of the input device is shown that is configured to provide a communicative and physical connection between the input device 104 and the computing device 102. The connection portion 202 as illustrated has a height and cross section configured to be received in a channel in the housing of the computing device 102, although this arrangement may also be reversed without departing from the spirit and scope thereof.

The connection portion 202 is flexibly connected to a portion of the input device 104 that includes the keys through use of the flexible hinge 106. Thus, when the connection portion 202 is physically connected to the computing device the combination of the connection portion 202 and the flexible hinge 106 supports movement of the input device 104 in relation to the computing device 102 that is similar to a hinge of a book.

The connection portion 202 is illustrated in this example as including magnetic coupling devices 204, 206, mechanical coupling protrusions 208, 210, and communication contacts 212. The magnetic coupling devices 204, 206 are configured to magnetically couple to complementary magnetic coupling devices of the computing device 102 through use of one or more magnets. In this way, the input device 104 may be physically secured to the computing device 102 through use of magnetic attraction.

The connection portion 202 also includes mechanical coupling protrusions 208, 210 to form a mechanical physical connection between the input device 104 and the computing device 102. The communication contacts 212 are configured to contact corresponding communication contacts of the computing device 102 to form a communicative coupling between the devices as shown.

Having discussed an example environment in which embodiments may operate, consider now some example device orientations in accordance with one or more embodiments.

Example Device Orientations

The following discussion presents some example device orientations in accordance with various embodiments.

Figure 3:
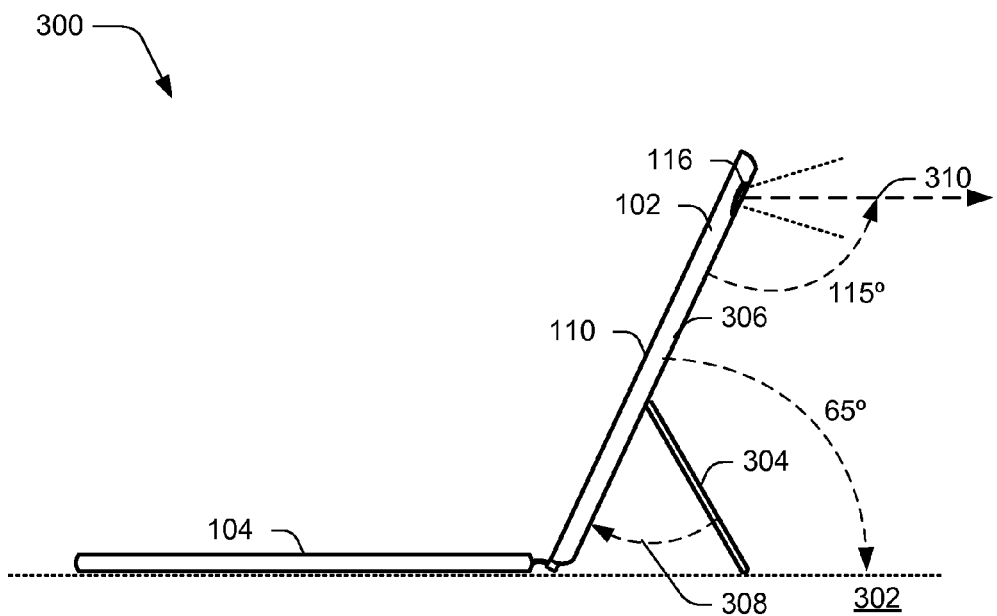
FIG. 3 depicts an example orientation of the computing device in accordance with one or more embodiments.

FIG. 3 illustrates an example orientation 300 of the computing device 102. In the orientation 300, the input device 104 is laid flat against a surface 302 and the computing device 102 is disposed at an angle to permit viewing of the display device 110, e.g., such as through use of a kickstand 304 disposed on a rear surface of the computing device 102. The orientation 300 can correspond to a typing arrangement whereby input can be received via the input device 104, such as using keys of the keyboard, a track pad, and so forth. For instance, the surface 302 can correspond to any suitable surface on which the computing device 102 and/or the input device 104 can be placed, such as a desk, a table, a floor, and so forth.

In at least some embodiments, the kickstand 304 can be configured to open to various preset positions. The preset positions, for instance, can correspond to angles with reference to a rear surface 306 of the computing device 102. In the illustrated example, the kickstand 304 is open to a preset position that corresponds to an angle 308 with reference to the rear surface 306. The angle 308 can be selected from a range of different angles. The angle 308, for instance, can include an angle between 20 degrees to 30 degrees (20°-30°).

Further to the example illustrated in FIG. 3, the computing device 102 includes the camera assembly 116. As mentioned above, the camera assembly 116 can include various components, such as a lens, a sensor, mirrors, a prism, and so forth. In at least some implementations, a field of view of the camera assembly faces away from the display device 110, such that a user who is interacting with the computing device 102 and/or the input device 104 can capture images of objects that the user is facing.

In at least some implementations, components of the camera assembly 116 can be mounted in the computing device 102 at an angle based on a tilt angle of the computing device 102. For instance, components of the camera assembly 116 can be mounted at an angle such that when the computing device is placed in the orientation 300, a field of view of the camera assembly 116 is substantially perpendicular to the surface 302, e.g., within 10 degrees (10°). The angle of the camera assembly 116, for example, can be such that in the orientation 300, an optical axis 310 of the camera assembly 116 is substantially parallel (e.g., within 10 degrees (10°)) to the surface 302.

For example, consider that the angle 308 of the kickstand 304 is such that the rear surface 306 is at an angle of 65 degrees (65°) to the surface 302. In this example, the camera assembly 116 can be angled in the computing device 102 such that the optical axis 310 is at an angle of 115 degrees to the rear surface 306 to enable the optical axis to be substantially parallel to the surface 302. Thus, in at least some embodiments, the camera assembly 116 can be mounted at an angle such that an angle of the optical axis 310 with respect to the rear surface 306 is supplementary to an angle of the rear surface 306 with respect to the surface 302.

Figure 4:
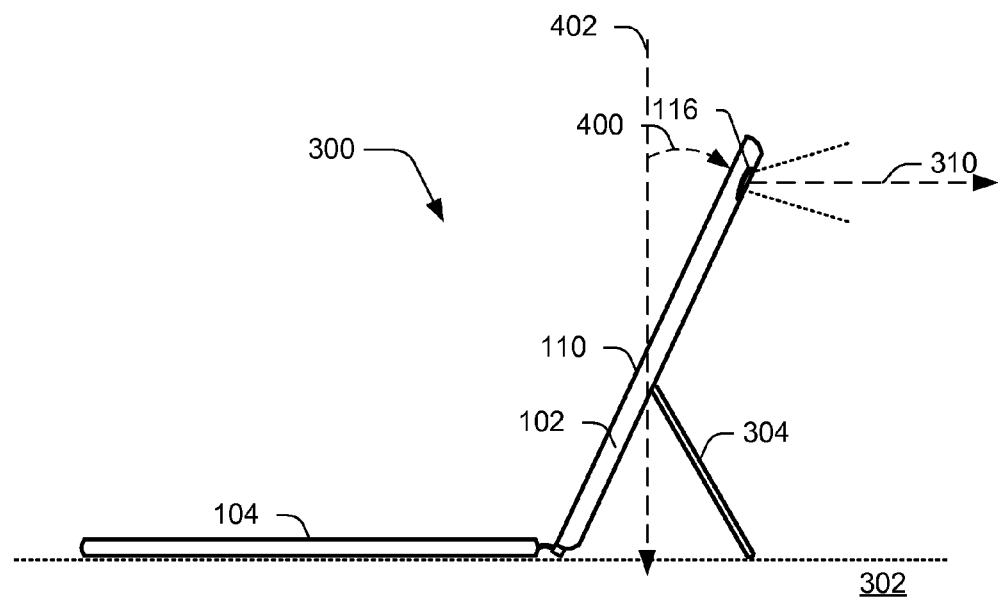
FIG. 4 depicts an example orientation of the computing device in accordance with one or more embodiments.

Additionally or alternatively, the camera assembly 116 can be adjustable to compensate for various orientations and/or angles of the computing device 102. For instance, consider the example illustrated in FIG. 4, where the computing device 102 is positioned in the orientation 300 discussed above.

In this example, an orientation of the computing device 102 is determined. For example, the orientation sensors 114 can detect that the computing device 102 is tilted at an angle 400 with reference to gravity, e.g., a gravitational vector 402. The orientation module 112 can receive this orientation information from the orientation sensors 114, and can perform various operations based on the orientation information. For instance, the orientation module 112 can cause one or more components of the camera assembly 116 to be physically adjusted based on the angle 400. The orientation module 112, for example, can cause one or more components of the camera assembly 116 to be tilted, panned, and so forth, such that the optical axis 310 is perpendicular to the gravitational vector 402. Additionally or alternatively, a variety of other adjustments can be made as well within the spirit and scope of the disclosed embodiments.

Components of the camera assembly 116 may also be adjustable based on an angle of the kickstand 304. For instance, the orientation module 112 can detect that the kickstand 304 is opened to a particular position. A hinge assembly that enables rotation of the kickstand 304, for example, can include a sensor mechanism that can detect an angle at which the kickstand 304 is disposed. Based on position of the kickstand 304, components of the camera assembly 116 can be tilted, panned, and so forth.

Orientation information can also be leveraged to perform various types of image processing. For instance, the camera module 118 can receive orientation information from the orientation module 112 and/or the orientation sensors 114. The camera module 118 can use the orientation information to perform image processing on a captured image, such as image correction to compensate for image distortion caused by an angle of the camera assembly 116 to an object being captured.

Figure 5:
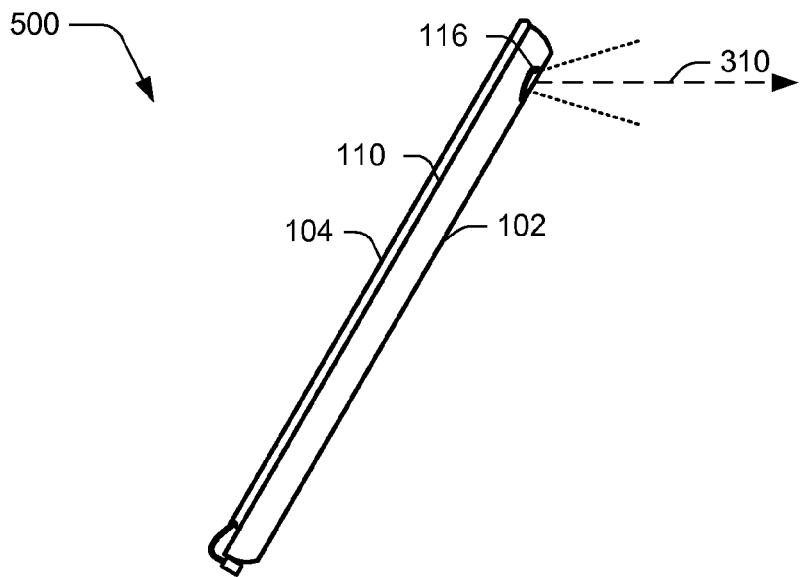
FIG. 5 depicts an example orientation of the computing device in accordance with one or more embodiments.

FIG. 5 illustrates that the input device 104 may be rotated such that the input device 104 is placed against the display device 110 of the computing device 102 to assume an orientation 500. In the orientation 500, the input device 104 may act as a cover such that the input device 104 can protect the display device 110 from harm. In implementations, the orientation 500 can correspond to a closed position of the computing device 102.

In the orientation 500, while the display device 110 may not be visible, the camera assembly 116 may nonetheless be used to capture images of objects. Further, techniques discussed herein may be employed to determine an orientation of the computing device 102, and to adjust the camera assembly 116 and/or images based on the orientation.

Figure 6:
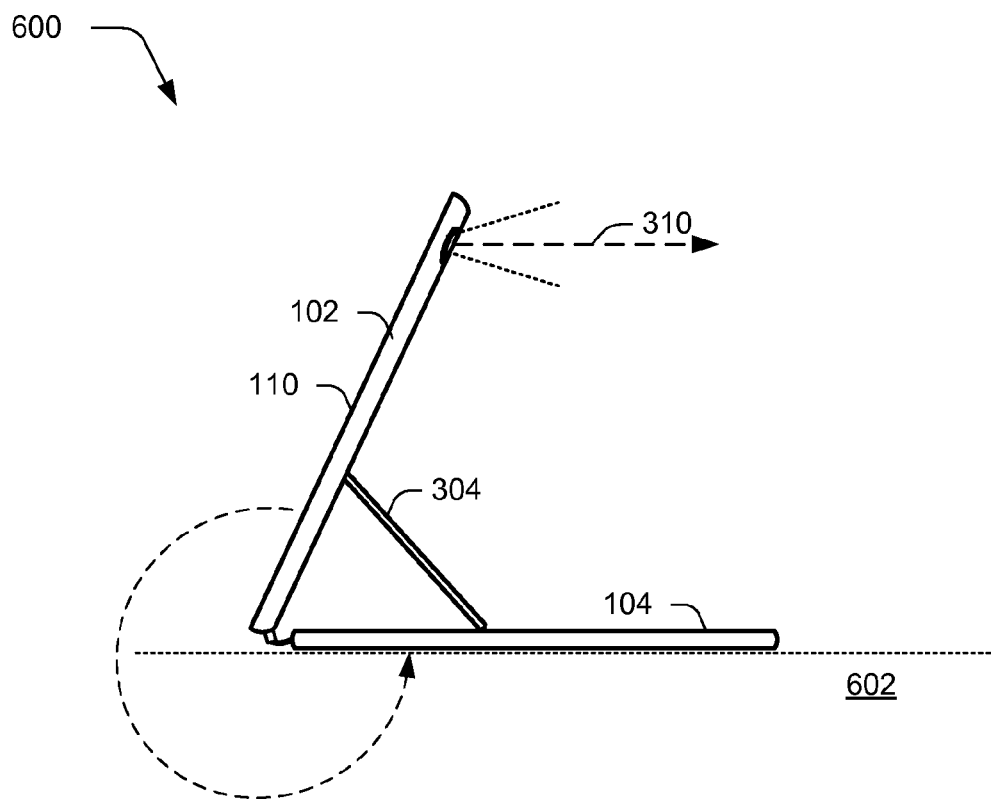
FIG. 6 depicts an example orientation of the computing device in accordance with one or more embodiments.

FIG. 6 illustrates a further example orientation of the computing device 102, generally at 600. In the orientation 600, the computing device 102 is placed on a surface 602 and is oriented such that the display device 110 faces away from the input device 104. In this example, the kickstand 304 can support the computing device 102, such as via contact with a back surface of the input device 104. Although not expressly illustrated here, a cover can be employed to cover and protect a front surface of the input device 104 from the surface 602.

Further to the example illustrated in FIG. 6, the camera assembly 116 can be angled as discussed above. For example, the camera assembly 116 can be angled such that the optical axis 310 is parallel to the surface 602. Additionally or alternatively, an orientation of the computing device 102 can be determined and leveraged to adjust components of the camera assembly 116, to perform image processing, and so forth.

Figure 7:
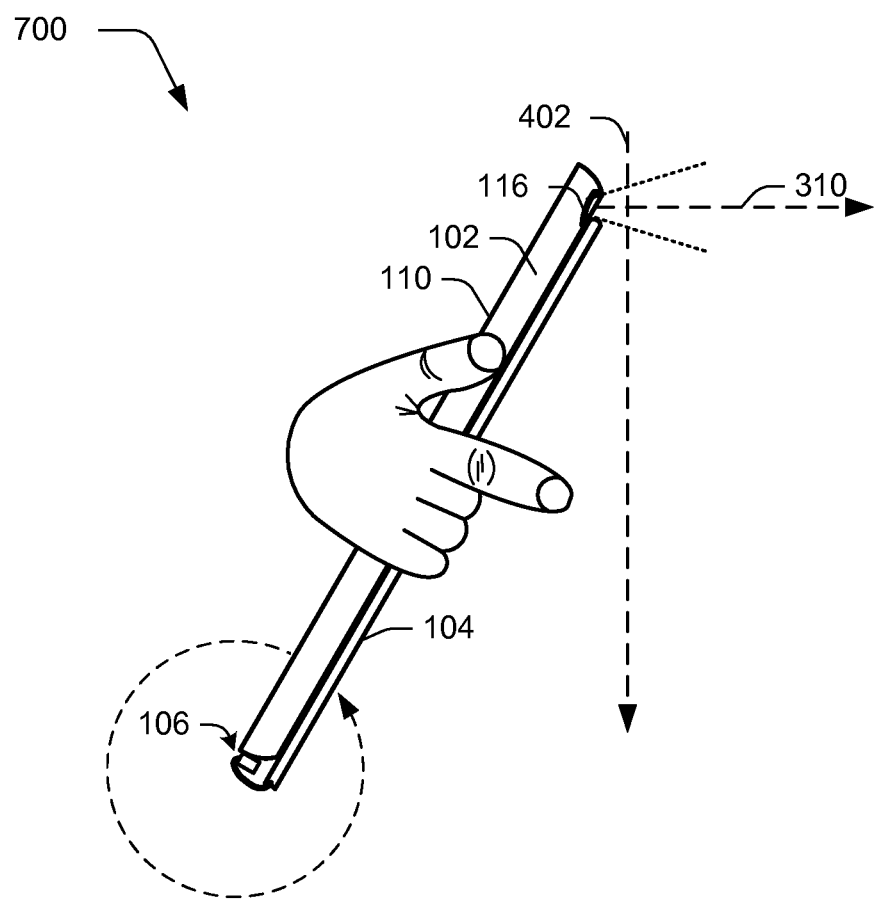
FIG. 7 depicts an example orientation of the computing device in accordance with one or more embodiments.

FIG. 7 illustrates an example orientation 700, in which the input device 104 may also be rotated so as to be disposed against a back of the computing device 102, e.g., against a rear housing of the computing device 102 that is disposed opposite the display device 110 on the computing device 102. In this example, the flexible hinge 106 is caused to "wrap around" to position the input device 104 at the rear of the computing device 102.

This wrapping causes a portion of a rear of the computing device 102 to remain exposed. This may be leveraged for a variety of functionality, such as to permit the camera assembly 116 to be used even though a significant portion of the rear of the computing device 102 is covered by the input device 104.

The orientation 700 can enable a variety of uses for the computing device 102. For instance, the orientation 700 can correspond to a handheld position of the computing device. In the handheld position, a user can grasp the computing device 102 in the orientation 700, and use the computing device to capture images of objects via the camera assembly 116. Thus, a user can point the camera assembly 116 toward an object to cause an image of the object to be displayed via the display device 110. The user can then activate functionality of the camera assembly 116 to capture an image of the object, such as by actuating a touch screen button displayed on the display device 110, pressing a button on the computing device 102 and/or the input device 104, and so on. Thus, the display device 110 can function as a preview display for images that can be captured via the camera assembly 116.

Further to the example illustrated in FIG. 7, the camera assembly 116 can be angled as discussed above. For example, the camera assembly 116 can be angled such that the optical axis 310 is parallel to the ground, perpendicular to the gravitational vector 402, and so on. Additionally or alternatively, an orientation of the computing device 102 can be determined and leveraged to adjust components of the camera assembly 116, to perform image processing, and so forth.

The example orientations discussed above are presented for purpose of example only, and techniques discussed herein can be implemented to enable images to be captured in a wide variety of different device orientations. Further, although the camera assembly 116 is illustrated in a particular position and orientation with reference to the computing device 102, this is not intended to be limiting. The camera assembly 116 can be oriented in a wide variety of different positions on the computing device 102 within the spirit and scope of the claimed embodiments. In at least some embodiments, for instance, the camera assembly 116 can include a front facing camera, e.g., a camera whose field of view faces the same direction as the display device 110. Further, the computing device 102 can employ multiple cameras that can capture different fields of view, e.g., multiple implementations of the camera assembly 116. For instance, both a front facing and a rear facing camera can be employed.

Having discussed some example device orientations, consider now some example camera assemblies in accordance with one or more embodiments.

Example Camera Assembly

Figure 8:
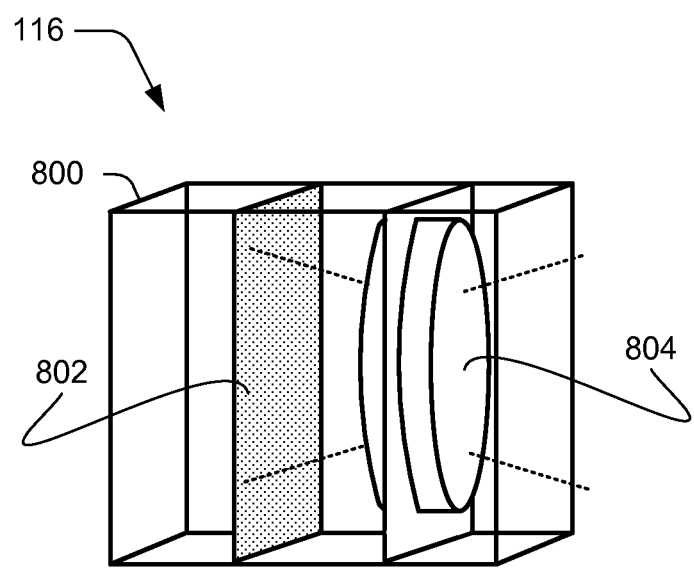
FIG. 8 depicts an example camera assembly in accordance with one or more embodiments.

FIG. 8 illustrates an example implementation of the camera assembly 116. Included as part of the camera assembly 116 are a carrier 800, which contains a sensor 802 and an optical intake 804. The carrier 800 is a mechanism that contains components of the camera assembly 116, and enables the components to be mounted in various configurations in the computing device 102. In implementations, the carrier 800 can be adjustably mounted in the computing device 102, such that the carrier 800 can be tilted, panned, rotated, and so forth. For example, the carrier 800 can be attached to a motor assembly that enables adjustment of the carrier 800 and/or components of the camera assembly 116 within the computing device 102.

The sensor 802 is representative of a device that can receive an optical image, and can convert the optical image into an electronic signal. Examples of the sensor 802 include a digital charge-coupled device (CCD), a complementary metal-oxide-semiconductor (CMOS) active pixel sensor, and so forth. Images converted by the sensor 802 can be utilized by other components and/or functionalities of the computing device 102, such as displayed via the display device 110, stored in memory, and so forth.

The optical intake 804 receives light externally from the computing device 102, and focuses the light on the sensor 802 to form an optical image on the sensor 802. The optical intake 804 can include a variety of components, such as different configurations and/or combinations of a lens, a prism, a mirror, and so forth. In at least some embodiments, the optical intake 804 is configured to focus light on particular portions of the sensor 802. Which portion of the sensor 802 can depend on an angle at which the computing device 102 is tilted, the camera carrier 800 is tilted, and so forth.

Figure 9:
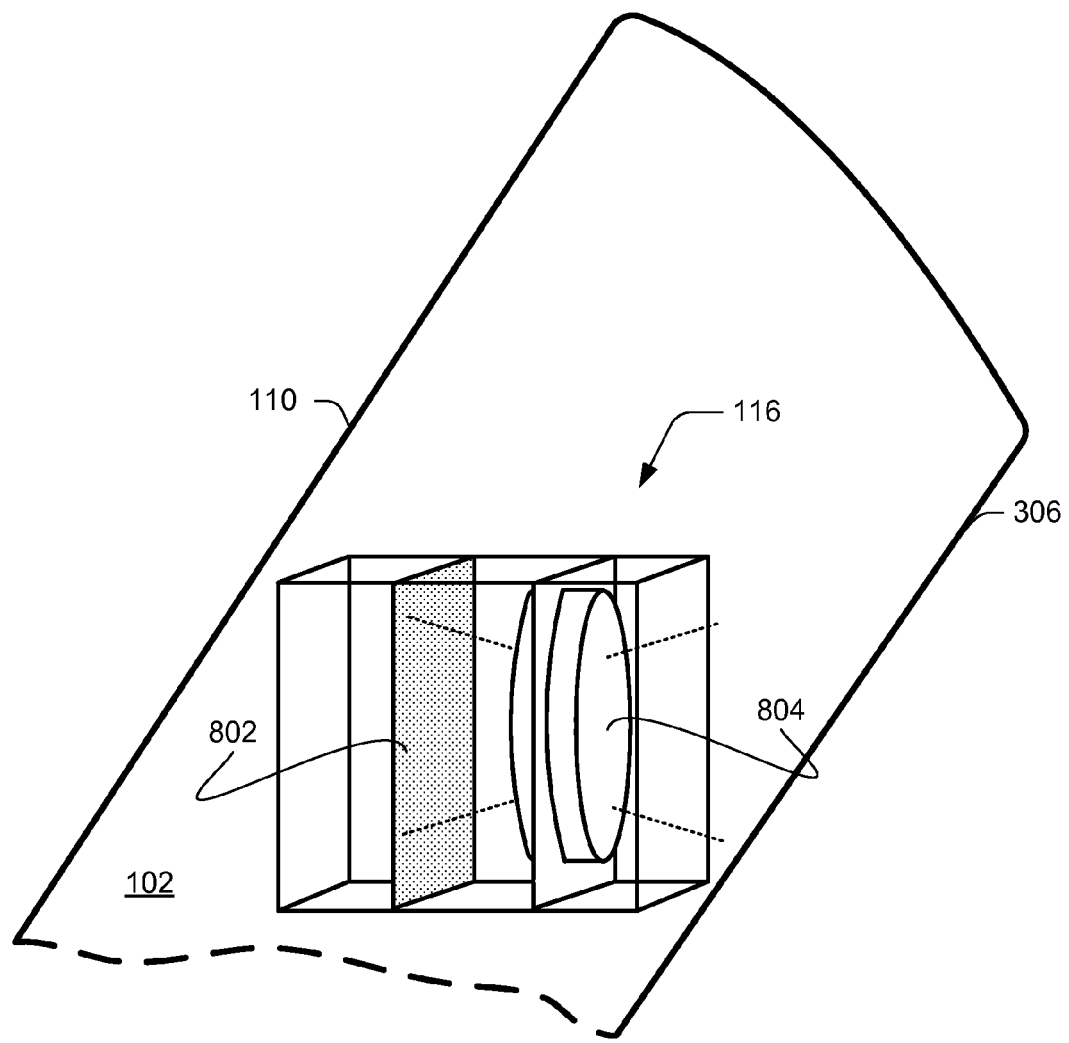
FIG. 9 depicts an example camera assembly in accordance with one or more embodiments.

FIG. 9 illustrates the camera assembly 116 in a partial view of the computing device 102. As shown in FIG. 9, the camera assembly 116 can be mounted at an angle in the computing device 102, such as with respect to the display device 110, the rear surface 306, and so on. Additionally or alternatively, the camera assembly can be physically adjustable in the computing device 102, such as via tilting, panning, rotating, and so on. For instance, the carrier 800 can be mounted on one or more axes, about which the carrier 800 can be manipulated to cause the camera assembly 116 to be angled in different directions.

Figure 10:
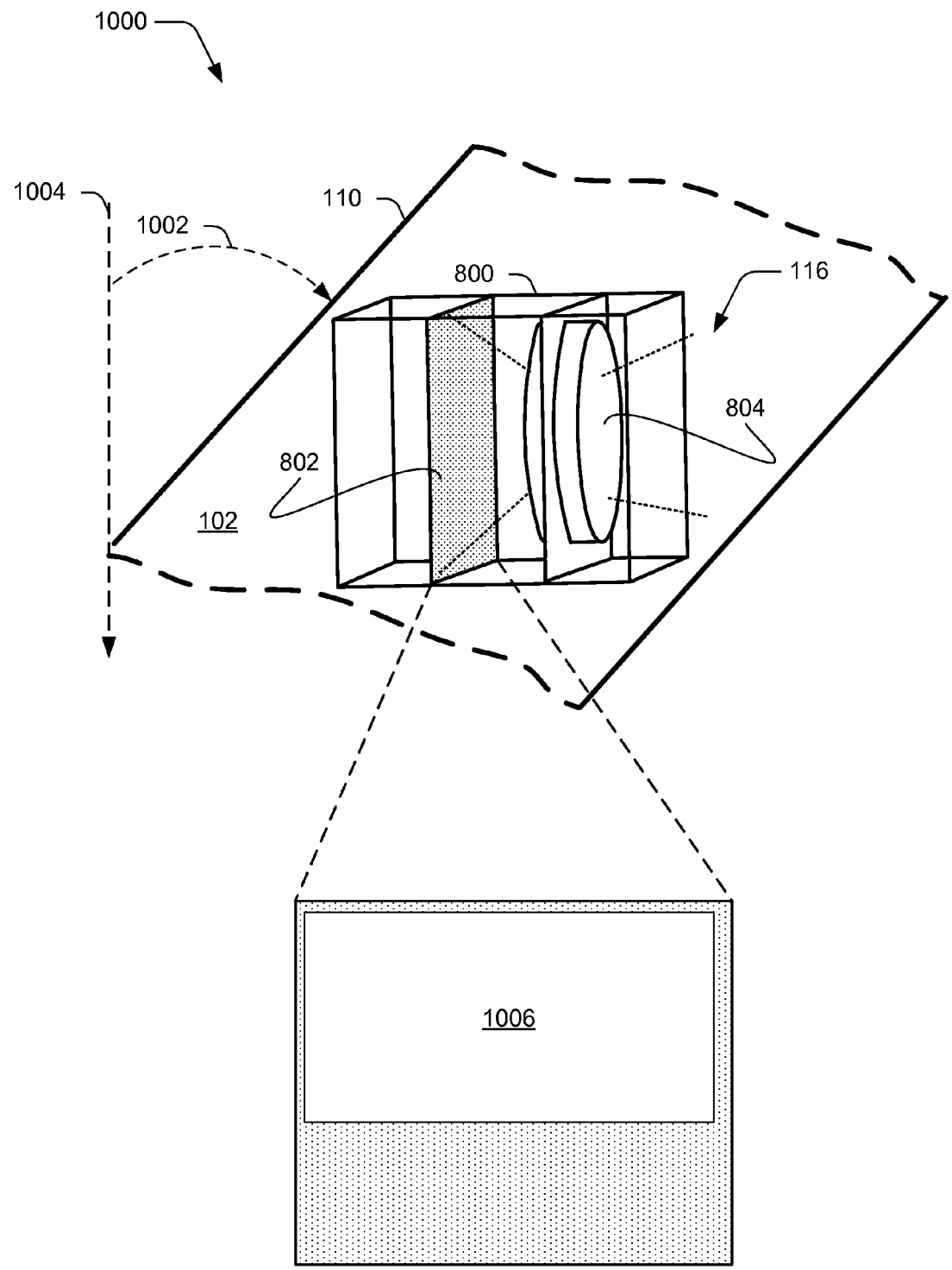
FIG. 10 depicts an example implementation scenario in accordance with one or more embodiments.

FIG. 10 illustrates an example scenario 1000, in which a region of the sensor 802 that is utilized to capture an image is based on a tilt angle of the computing device 102. In the upper portion of the scenario 1000, the computing device 102 is tilted at an angle 1002. The angle 1002, for instance, can be an angle of a plane formed by the display device 110, with reference to a gravitational vector 1004 detected via the orientation sensors 114.

In the lower portion of the scenario 1000, an image tile 1006 is defined for the sensor 802 based on the angle 1002. In at least some implementations, the sensor 802 can be mapped to determine which portion(s) of the sensor 802 to use to generate image data based on tilt angles of the computing device 102, the camera assembly 116, and so forth. In some orientations, for instance, the angle of incident light on the optical intake 804 can be such that light that passes through the optical intake 804 can focus on sub-portions of the sensor 802. This can enable a sensor to be divided into sub-portions (e.g., the image tile 1006) that are used to generate images based on determined angles of orientation. Additionally or alternatively, a sub-portion of the sensor 802 to be used to capture an image can be calculated on the fly, such as based on an angle of orientation, external light levels, resolution settings for the camera assembly 116, and so forth.

Mapping the sensor 802, for instance, can include determining a threshold optical signal-to-noise ratio (SNR) to be used to capture images. For example, image data received from the sensor 802 that exceeds the threshold SNR can be utilized to capture an image, while image data that does not exceed the threshold SNR can be ignored. Alternatively, image data that does not exceed the threshold SNR can be processed to increase the quality of a resulting image, such as using noise reduction techniques, light enhancement techniques, and so on.

Further to mapping the sensor 802, focus regions (e.g., image tiles) of the sensor 802 that correspond to particular orientation angles can be predetermined by measuring light intensity (e.g., signal intensity) on different regions of the sensor 802 when the computing device 102 is oriented at different angles. Regions that exceed a threshold light intensity can be used to capture an image, such as by defining image tiles within regions of the sensor 802 that receive focused light at and/or above the threshold light intensity.

Thus, the image tile 1006 corresponds to a portion of the sensor 802 that is used to capture an image when the computing device is positioned at the angle 1002. Further, data generated from regions of the sensor 802 that are external to the image tile 1006 can be ignored, or processed to enhance image quality. If the computing device 102 is tilted to a different angle, a different image tile can be determined. For instance, consider the following example.

Figure 11:
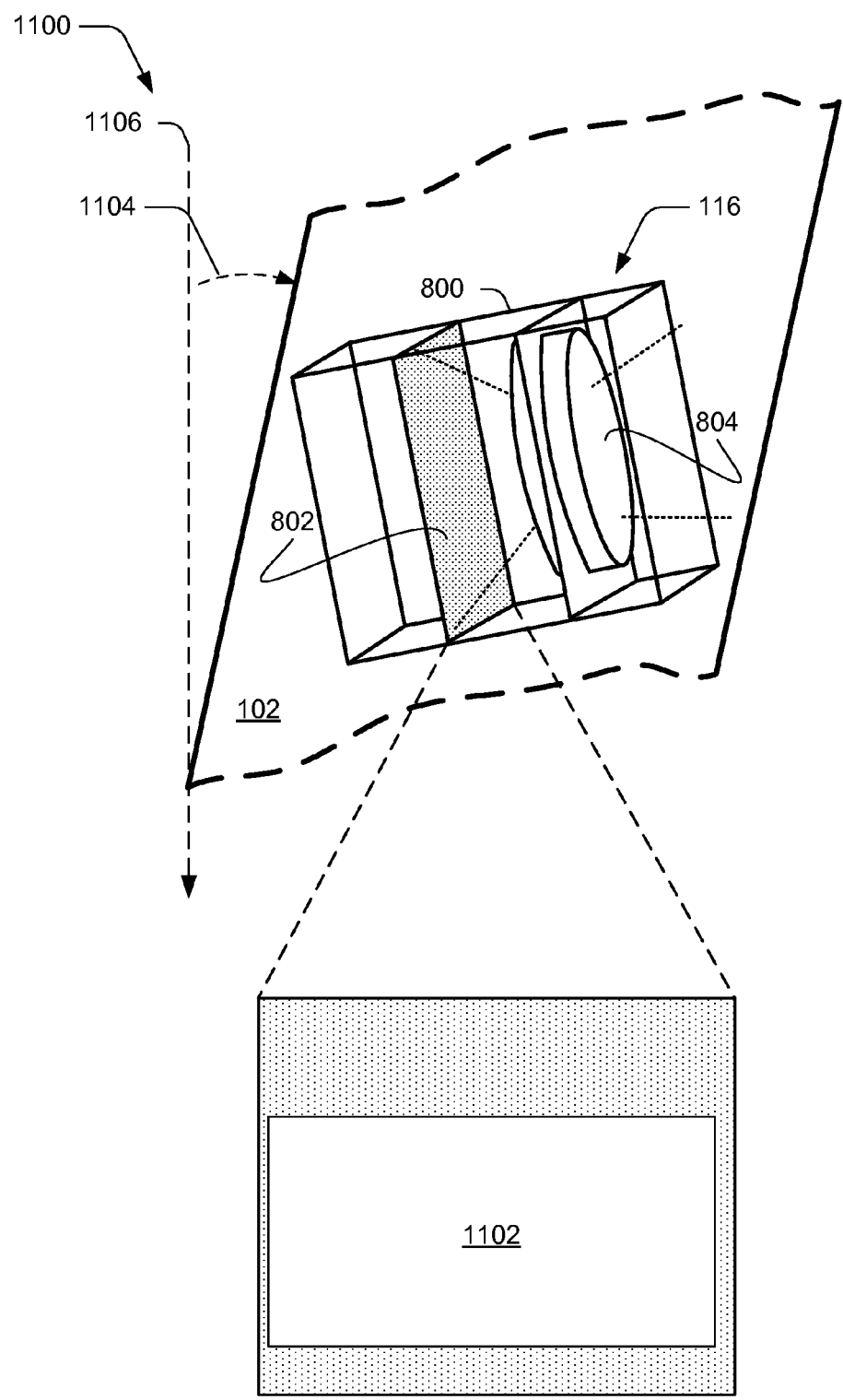
FIG. 11 depicts an example implementation scenario in accordance with one or more embodiments.

FIG. 11 illustrates an example scenario 1100, in which an image tile 1102 is defined based on an angle of orientation of the computing device 102. The computing device 102, for instance, can be positioned at an angle 1104 with reference to a gravitational vector 1106. Thus, the computing device 102 is positioned at a different orientation than described above with reference to FIG. 10. Thus, the image tile 1102 is defined at a different region of the sensor 802 than was the image tile 1006 described in FIG. 10. Accordingly, different portions of the sensor 802 can be used to capture images, based on an angle of orientation of the computing device 102, of the camera assembly 116, and so forth.

Example Procedure

Figure 12:
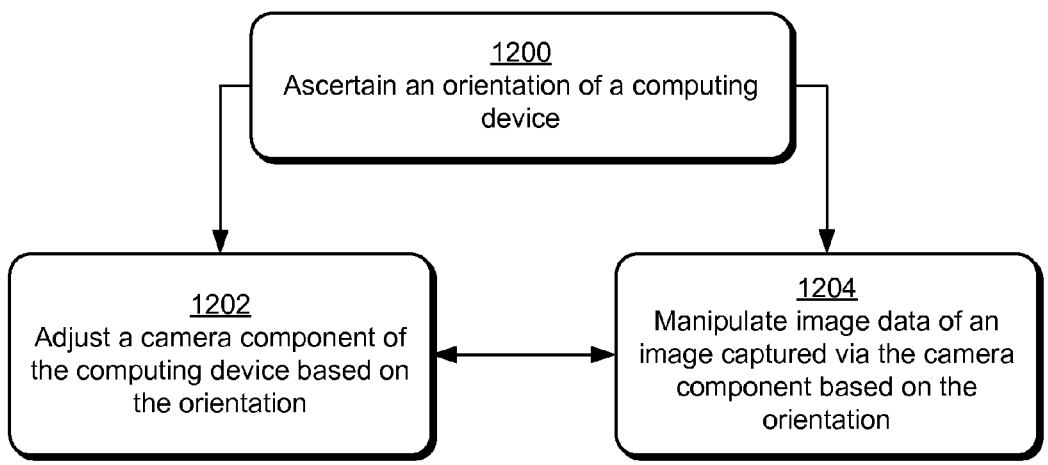
FIG. 12 is a flow diagram that describes steps in a method in accordance with one or more embodiments.

FIG. 12 is a flow diagram that describes steps in a method in accordance with one or more embodiments. In at least some embodiments, the method can be employed to determine an orientation of a computing device with respect to an input device.

Step 1200 ascertains an orientation of a computing device. For example, an orientation of the computing device 102 relative to earth's gravity (e.g., a gravitational vector) can be determined. In implementations, this can include determining an angle at which the computing device 102 is oriented with reference to earth's gravity. As referenced above, however, a variety of different techniques can be employed to ascertain an orientation of a computing device.

Step 1202 adjusts a camera component of the computing device based on the orientation. For instance, one or more of the carrier 800, the sensor 802, and/or the optical intake 804 can be physically tilted, panned, rotated, and so forth, based on an angle of orientation of the computing device 102. As referenced above, a variety of different types of mechanisms can be used to accomplish such adjustment. For instance, a motor can be attached to an axis of the carrier 800, and can rotate the carrier 800 to enable various components of the camera assembly 116 to be positioned at different angles.

Step 1204 manipulates image data for an image captured via the camera component based on the orientation. For instance, various types of image corrections and/or image enhancements can be applied to image data based on the orientation. In an example implementation, for instance, a specific region of the sensor 802 can be associated with low light levels at particular orientations of the computing device 102. Thus, when the computing device 102 is in such orientations, light enhancement and/or light correction techniques can be applied to image data received from the region. As another example, a specific region of the sensor 802 can be associated with image distortion (e.g., barrel distortion, pincushion distortion, and so forth) at particular orientations of the computing device 102. Thus, when the computing device 102 is in such orientations, image data correction techniques can be applied to image data received from the region to correct for the image distortion.

In implementations, steps 1200, 1202, and 1204 can occur together, sequentially, alternatively, and so on.

Example System and Device

Figure 13:
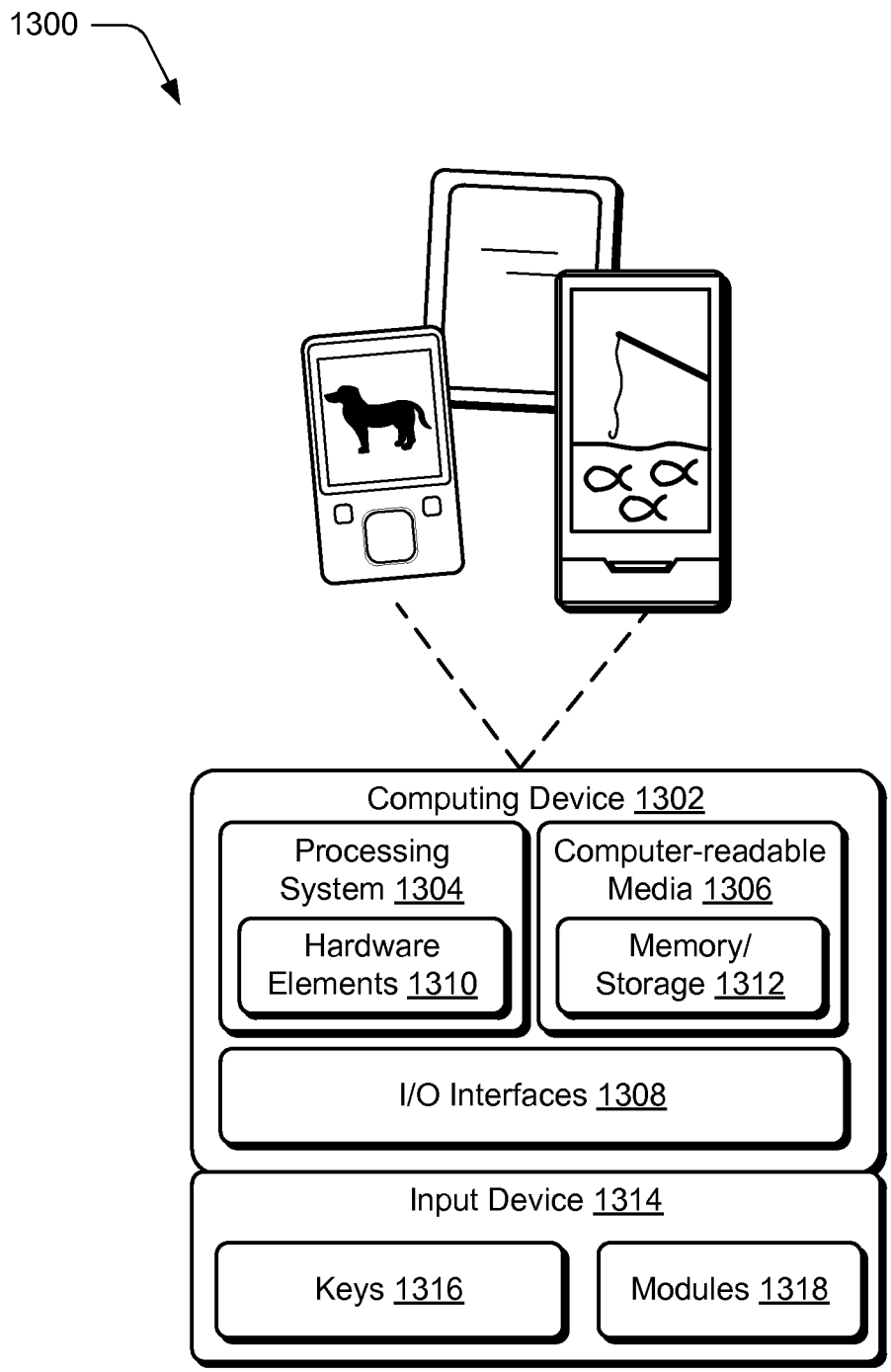
FIG. 13 illustrates an example system including various components of an example device that can be implemented as any type of computing device as described with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. The computing device 1302 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways to support user interaction.

The computing device 1302 is further illustrated as being communicatively and physically coupled to an input device 1314 that is physically and communicatively removable from the computing device 1302. In this way, a variety of different input devices may be coupled to the computing device 1302 having a wide variety of configurations to support a wide variety of functionality. In this example, the input device 1314 includes one or more keys 1316, which may be configured as pressure sensitive keys, mechanically switched keys, and so forth.

The input device 1314 is further illustrated as include one or more modules 1318 that may be configured to support a variety of functionality. The one or more modules 1318, for instance, may be configured to process analog and/or digital signals received from the keys 1316 to determine whether a keystroke was intended, determine whether an input is indicative of resting pressure, support authentication of the input device 1314 for operation with the computing device 1302, and so on.

Shifted Lens Camera Embodiments

In the area of mobile computing and smart devices, the use of a tilted camera and/or camera assembly in mobile computing devices tends to limit the optical total track of the camera module. The limited optical total track also tends to limit the size of the imaging sensor that can be used. The smaller imaging sensor may result in reduced light gathering capability, compromised signal-to-noise ratio (SNR) and therefore noisier video and still images.

Figure 14:
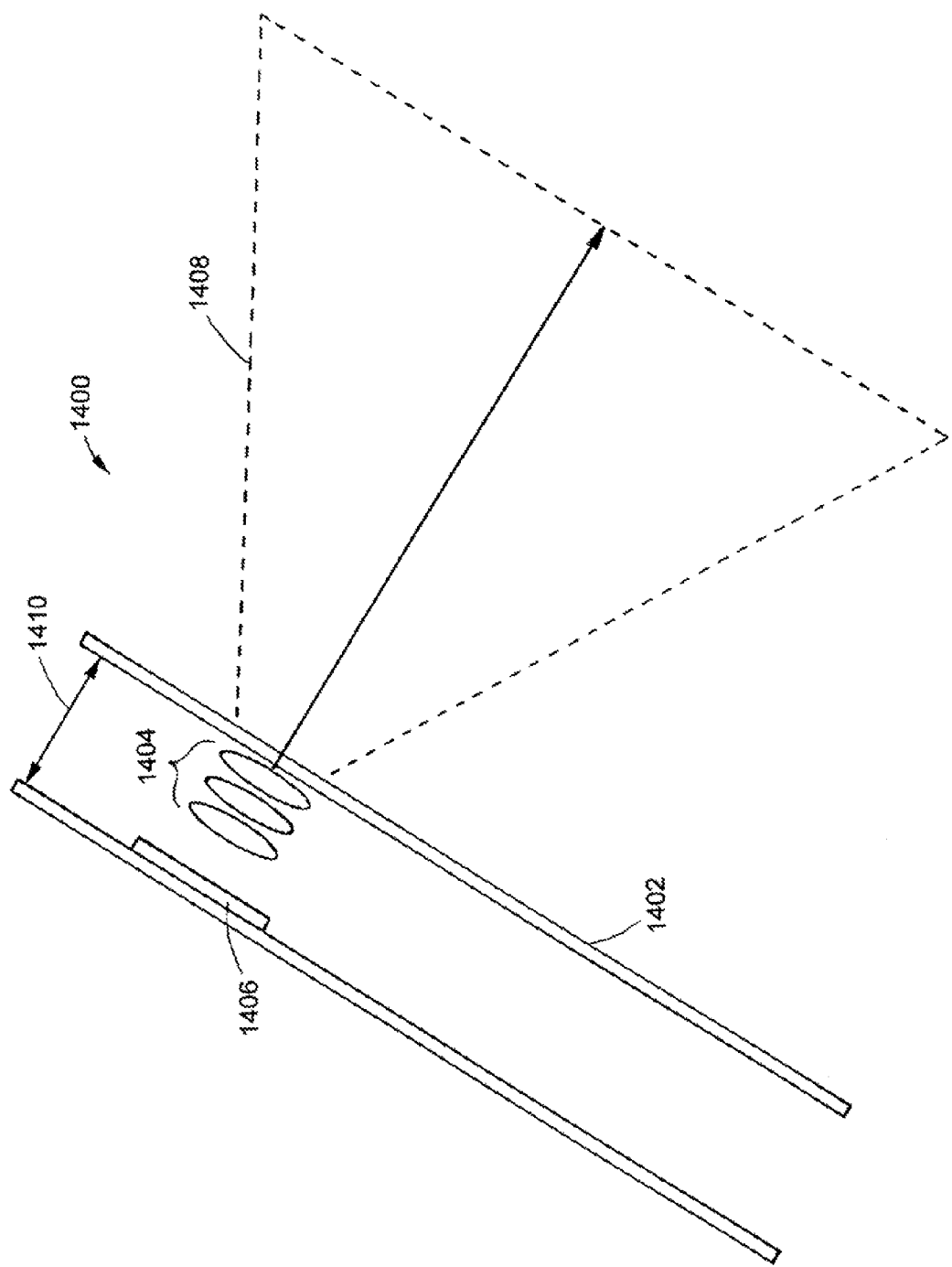
FIG. 14 is one embodiment of a camera assembly that comprises a Field of View perpendicular to the surface of a smart device.

FIG. 14 is one embodiment (1400) of a camera/camera assembly as employed in a mobile/smart device 1402. In this embodiment, a camera assembly may comprise a lens stack 1404 and a sensor 1406—which may be affixed or otherwise mated on opposing surfaces and/or sides of the smart device. The lens stack is further affixed and/or attached to the device such that the lens stack receives light through an aperture in one of the surfaces and/or sides the device. The Total Track Length (TTL)—as shown in this example as 1410, is the distance between the front of the lens stack 1404 and the sensor 1406. It is well known that the TTL is related to the Field of View (FOV)—as depicted in this example as 1408—in a given camera assembly. However, this camera configuration may not be desirable from the standpoint that-when implemented in a smart device as shown in FIG. 3, the FOV would not be horizontal (as depicted as 310 in FIG. 3) when the kickstand 304 is supporting the smart device.

Figure 15:
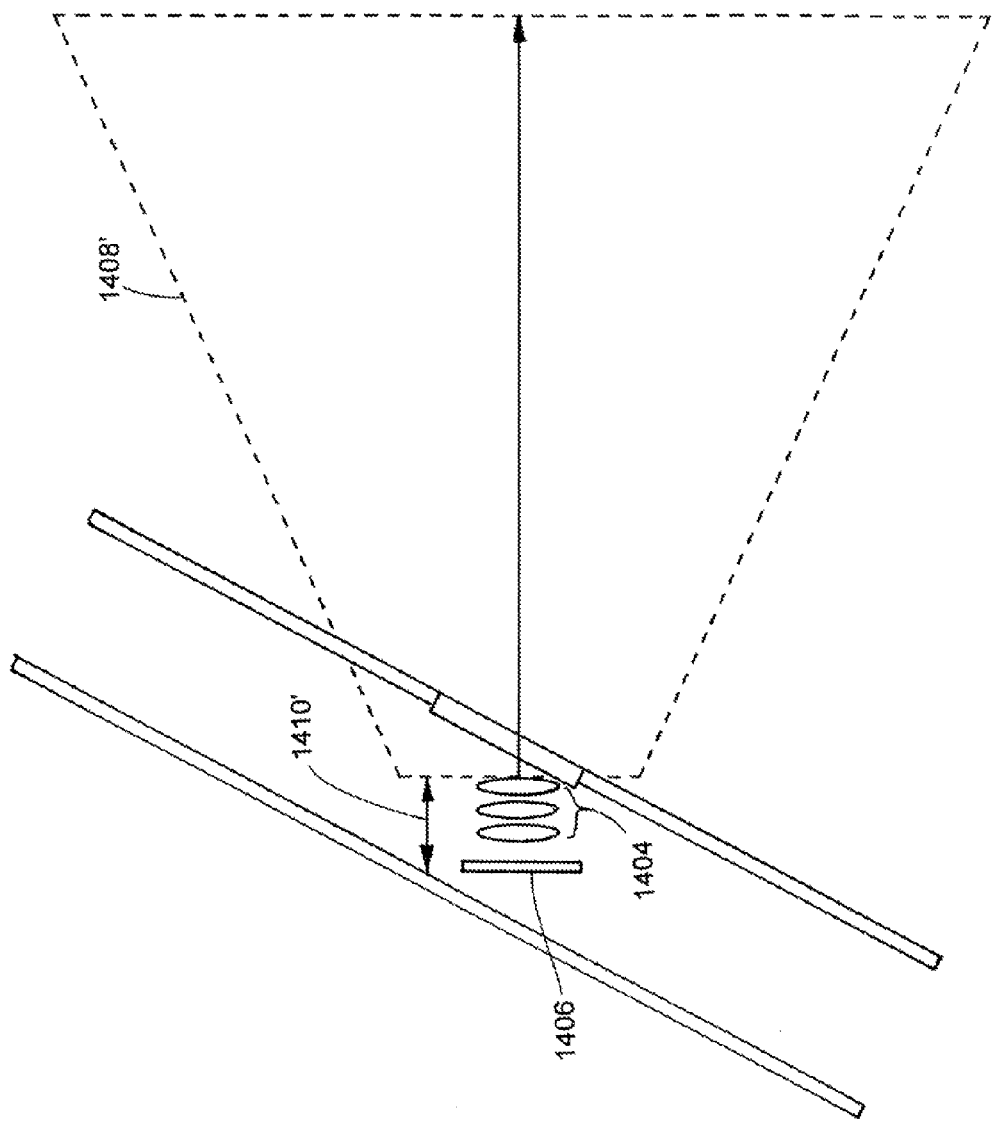
FIG. 15 is another embodiment of a camera assembly that comprises a Field of View that has a particular angle with the surface of the smart device with a given Total Track Length.

FIG. 15 is one embodiment of a camera assembly that tends to remedy this situation. In this case, the lens stack 1404 is tilted to the surfaces of the smart device. Sensor 1406 is deployed on the same optical axis as the lens stack. Both lens stack 1040 and sensor 1406 may be fixedly attached or otherwise mated with the smart device as shown, in any manner known. Depending on the angle at which the center of the optical axis presents with respect to the surface of the device, the FOV (1408') may now be seen to be substantially horizontal, when the smart device is being supported by the kickstand.

However, it will be noticed that the TTL 1410' may now be less than as the TTL 1410 of FIG. 14. This may result in poorer performance (e.g., less light captured, etc.) when compared with the camera assembly as shown in FIG. 14.

Figure 16:
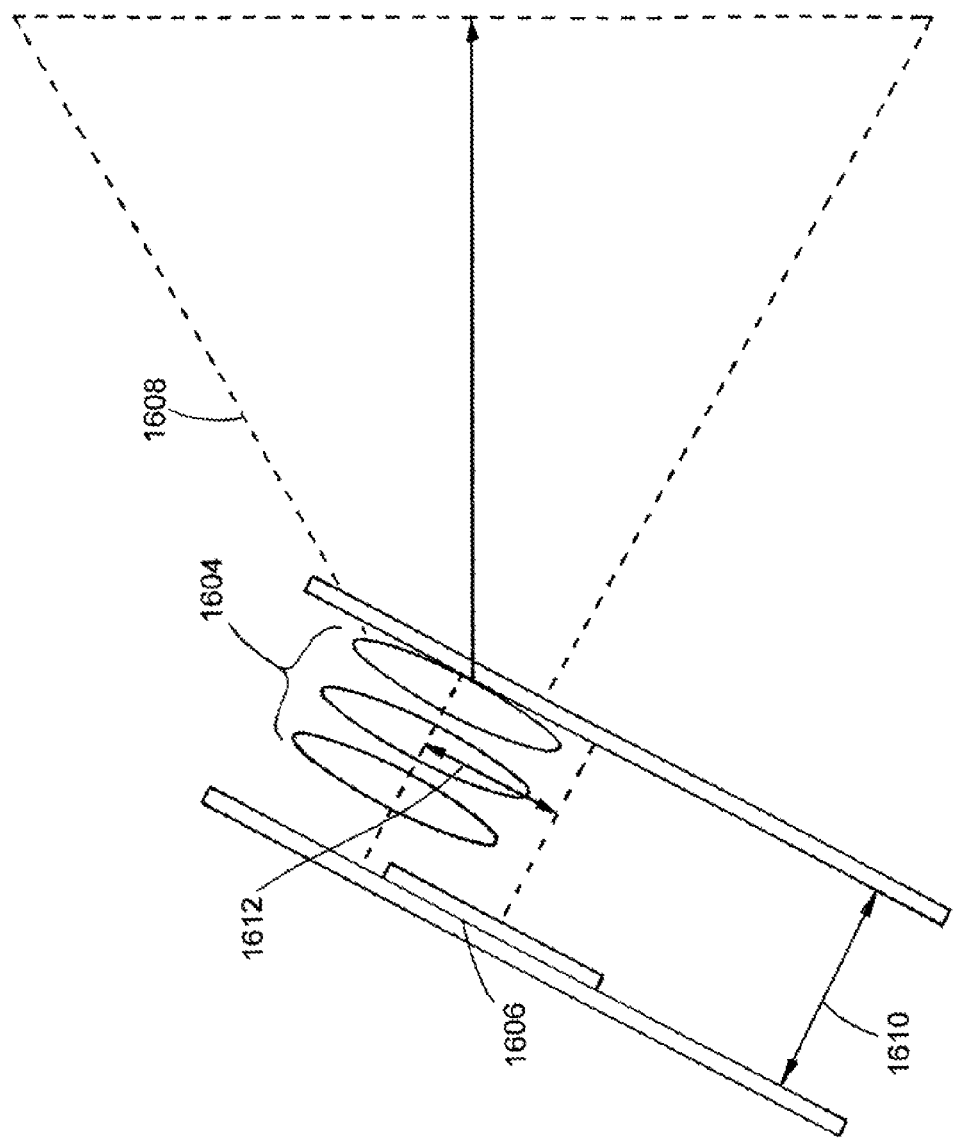
FIG. 16 is one embodiment of a camera assemble that comprises a Field of View that has a particular angle with the surface of the smart device with a greater Total Track Length as compared with FIG. 15.

Thus, as opposed to using a tilted camera/lens configuration, it may be desirable to employ a shifted camera/lens configuration. FIG. 16 is one embodiment of present system/camera assembly as made in accordance with the principles of the present application.

As may be seen, the center of lens stack 1604 is offset from the center of the sensor 1606 by a distance 1612. The distance 1612 may depend upon the optical properties of the lens stack and the application of the Scheimpflug principle. The Scheimpflug principle allows for the positioning of the plane of sharpest focus (from the positioning of the sensor plane and the lens stack plane) to be desirably directed outwardly from the smart device with a FOV 1608. This FOV may be directed so that the FOV is horizontal when the smart device is held in place by a kickstand or some other support device.

As may also be noted in one embodiment, the front of the lens stack is substantially positioned at the surface of the front (or first) side of the device. In addition, the sensor may be substantially positioned at the surface of the back (or second) side of the device. In this case, it may be seen that the TTL is substantially the depth of the device, which may be seen as substantially the distance between the first side and the second side of the device.

In addition to having the desired angle for the FOV, it should be noted that the TTL 1610 may now be longer than the TTL of the configuration of FIG. 15. Thus, by using a shifted lens (i.e., moving the lens position away from the optical center of the imaging sensor) allows an effective tilt up of the field of view (FOV). This may allow the imaging sensor and lens to be placed parallel to the sides of the computing device which allows use of the full width of the computing device for optical total track. The resulting larger optical total track may allow for the use of larger imaging sensors in the camera module that give better SNR and better customer experience.

In many embodiments described herein, it may be possible to employ a sensor having a sensing area (e.g., in a 4:3 area format) that may larger than, and use only a portion of, the image projected by the lens stack. The image captured by the sensor may then be output in a sub-window (e.g., via digital cropping techniques)—e.g. in a 16:9 area format. In some embodiment, such digital cropping has substantially the same effect as shifting the lens stack, as described in reference to FIG. 16.

The use of shifted lens optics may also allow for improved camera performance in small form factor computing devices with cameras at an angle. In one aspect, it may be desirable to utilize cameras at an angle to reduce the volume used, resulting from rotation of a camera module in a small device.

In one embodiment disclosed herein, instead of building a camera module that has the sensor and lens aligned with the lens center directly in line with the sensor's optical center, the camera module may be designed and built with the lens center slightly off-set from the sensor's center. This will shift the center of the field of view from being perpendicular to the sensor's center and move the FOV's center upward at an angle proportional to a shift distance of the lens relative to the sensor's optical center. This shift in the lens from optical center allows a mobile computer device's imaging sensor and lens to be co-planar with the sides of the device. This co-planar alignment allows for a larger distance from the front lens element to the sensor—i.e., the optical total track (TTL). Larger TTL allows for the use of a larger sensor for better image capture in low light and simplification of the lens design.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

Techniques may further be implemented in a network environment, such as utilizing various cloud-based resources. For instance, methods, procedures, and so forth discussed above may leverage network resources to enable various functionalities.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An apparatus comprising:
a housing of a computing device having a first side and a second side;
a kickstand that is deployable to stand the apparatus on a surface such that the apparatus stands at a first angle in relation to the surface; and
a camera assembly that includes a sensor and a lens stack comprising multiple lenses, the camera assembly mounted within the housing of the computing device such that:
the sensor is attached to the first side of the housing; and
the lens stack is attached to the second side of the housing in a shifted position relative the sensor such that in the shifted position:
a first axis that extends through a center of each lens of the lens stack is parallel to a second axis that extends perpendicularly from a face of the sensor;
a shift distance between the first axis and the second axis in the shifted position is based on the first angle; and
a field of view (FOV) formed by the camera assembly is substantially parallel to the surface when the kickstand is deployed.

2. The apparatus of claim 1 wherein a total track length (TTL) of the camera assembly corresponds to a distance between the first side and the second side of the housing of the computing device.

3. The apparatus of claim 1 wherein substantial parallelism of the FOV is within 10 degrees of parallel.

4. The apparatus of claim 1 wherein the kickstand is configurable to be deployed in multiple preset positions, one of the preset positions causing the apparatus to stand at the first angle in relation to the surface.

5. The apparatus of claim 4 wherein the other preset positions cause the apparatus to stand within a range of angles in relation to the surface, and the FOV is substantially parallel to the surface while the kickstand is deployed in the other preset positions.

6. The apparatus of claim 1 wherein the sensor comprises a sensing area larger than an image projected by the lens stack.

7. The apparatus of claim 1 wherein an image captured by the sensor is capable of being digitally cropped and output to a sub-window.

8. The apparatus of claim 7 wherein a sensor area of the sensor has a 4:3 ratio.

9. The apparatus of claim 7 wherein a sub-window area of the sub-window has a 16:9 ratio.

10. An apparatus comprising:
a housing of a computing device having a first side and a second side that is opposite the first side and includes an aperture;
a kickstand that is configurable to be deployed in multiple preset positions to stand the apparatus on a substantially horizontal surface, at least one of the positions enabling the apparatus to stand at a first angle in relation to the substantially horizontal surface; and a camera assembly that includes a sensor and a lens stack, the camera assembly mounted within the housing of the computing device such that:

the sensor is attached to the first side of the housing; and the lens stack is attached to the second side of the housing that includes the aperture, and is attached in a shifted position relative the sensor such that in the shifted position:

a first axis that extends through a center of lenses of the lens stack is parallel to a second axis that extends perpendicularly from a face of the sensor;

a shift distance corresponding to the shifted position is between the first axis and the second axis and is proportional to the first angle; and a plane of sharpest focus formed by the camera assembly is directed outwardly from the apparatus to have an optical axis that is substantially horizontal when the kickstand is deployed.

11. The apparatus of claim 10 wherein a total track length (TTL) of the camera assembly corresponds to a distance between the first side and the second side of the housing of the computing device.

12. The apparatus of claim 10 wherein the kickstand is mechanically operable to be deployed in the multiple preset positions.

13. The apparatus of claim 10 wherein the camera assembly has a field of view (FOV) that is parallel to the horizontal surface when the computing device is supported by the kickstand resting upon the horizontal surface.

14. The apparatus of claim 10 wherein a sensing area of the sensor is larger than an image projected by the lens stack on the sensor.

15. The apparatus of claim 10 wherein an image captured by the sensor is capable of being digitally cropped and output to a sub-window.

16. An apparatus comprising:

a housing of a computing device having a first side and a second side;

a kickstand that is coupled to the housing of the computing device and is configured to be deployed in multiple preset positions to stand the apparatus on a surface, at least one of the positions enabling the apparatus to stand at a first angle in relation to the surface; and a camera assembly that includes a sensor and a lens stack, the camera assembly mounted within the housing of the computing device such that:

the sensor is disposed on the first side of the housing; and the lens stack is disposed on the second side of the housing in a shifted position relative the sensor such that in the shifted position:

a first axis that extends through a center of lenses of the lens stack is parallel to a second axis that extends from a face of the sensor;

a shift distance between the first axis and the second axis, used to mount the lens stack in the shifted position relative the sensor, is proportional to the first angle; and a field of view (FOV) formed by the camera assembly is parallel to the surface when the kickstand is deployed.

17. The apparatus of claim 16 wherein the FOV of the camera assembly is parallel to another surface when the computing device is supported by the kickstand resting upon the other surface.

18. The apparatus of claim 16 wherein a total track length (TTL) of said camera assembly corresponds to a distance between the first side and the second side of the housing of the computing device.

19. The apparatus of claim 16 wherein in the shifted position a plane of sharpest focus formed by the camera assembly is directed outwardly from the apparatus to have an optical axis that is parallel to the surface.

20. The apparatus of claim 16 wherein the shift distance is determined based on application of the Scheimpflug principle.

21. The apparatus of claim 1 wherein a front of the lens stack is positioned at an inside surface of the second side of the housing of the computing device and the sensor is positioned at an inside surface of the first side of the housing of the computing device.

22. The apparatus of claim 10 wherein a front of the lens stack is positioned at an inside surface of the second side of the housing of the computing device and the sensor is positioned at an inside surface of the first side of the housing of the computing device.

23. The apparatus of claim 16 wherein a front of the lens stack is positioned at an inside surface of the second side of the housing of the computing device and the sensor is positioned at an inside surface of the first side of the housing of the computing device.

* * * * *